US008897231B2

(12) United States Patent
Sawahashi et al.

(10) Patent No.: US 8,897,231 B2
(45) Date of Patent: Nov. 25, 2014

(54) MOBILE STATION, BASE STATION AND COMMUNICATIONS METHOD

(75) Inventors: Mamoru Sawahashi, Yokohama (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1418 days.

(21) Appl. No.: 11/917,342

(22) PCT Filed: Jun. 13, 2006

(86) PCT No.: PCT/JP2006/311875
§ 371 (c)(1),
(2), (4) Date: Jul. 30, 2009

(87) PCT Pub. No.: WO2006/134946
PCT Pub. Date: Dec. 21, 2006

(65) Prior Publication Data
US 2009/0303937 A1 Dec. 10, 2009

(30) Foreign Application Priority Data

Jun. 14, 2005 (JP) ................................ 2005-174397
Oct. 31, 2005 (JP) ................................ 2005-317568
Jan. 17, 2006 (JP) ................................ 2006-009301
Feb. 8, 2006 (JP) ................................ 2006-031751
May 1, 2006 (JP) ................................ 2006-127988

(51) Int. Cl.
*H04W 4/00* (2009.01)
(Continued)

(52) U.S. Cl.
CPC ............ *H04W 74/02* (2013.01); *H04L 5/0064* (2013.01); *H04B 1/707* (2013.01);
(Continued)

(58) Field of Classification Search
USPC ........................................................ 370/329
See application file for complete search history.

(56) References Cited

U.S. PATENT DOCUMENTS 6,842,435 B1    1/2005   Doblmaier et al.
7,570,957 B2    8/2009   Atarashi et al.
(Continued)

FOREIGN PATENT DOCUMENTS

CA    2261933 A1    2/1998
CN    1440212 A     9/2003
(Continued)

OTHER PUBLICATIONS

Uplink Multiple Access Scheme for Evolved UTRA, NTTDoCoMo, Apr. 4-8, 2005, 3GPP TSG RAN WG1 R1-050248, pp. 1-7.*
(Continued)

*Primary Examiner* — Brandon Renner
*Assistant Examiner* — Faisal Choudhury
(74) *Attorney, Agent, or Firm* — Osha Liang LLP

(57) ABSTRACT

A disclosed mobile station includes a multiplexing portion that multiplexes a contention-based channel and a non-contention-base channel, and a transmitting portion that transmits the multiplexed contention-based and non-contention-based channels to a base station. In the mobile station, the contention-based channel and the non-contention-based channel are distinguished from whether scheduling is performed before transmission in the base station. The contention-based channel includes one or more of a fast access channel, a reservation channel, and a synchronization channel. The non-contention-based channel includes one or more of an uplink shared data channel and an uplink shared control channel. The fast access channel includes traffic data, or control data having a data size smaller than a predetermined size, or a combination thereof. The reservation channel includes information to request scheduling the non-contention-based channel. The uplink data channel includes the traffic data, or the control data, or a combination thereof.

9 Claims, 35 Drawing Sheets

(51) Int. Cl.
*H04W 74/02* (2009.01)
*H04L 5/00* (2006.01)
*H04B 1/707* (2011.01)
*H04L 1/00* (2006.01)
*H04L 1/18* (2006.01)
*H04W 28/04* (2009.01)
*H04W 52/14* (2009.01)
*H04W 52/32* (2009.01)
*H04W 72/12* (2009.01)

(52) U.S. Cl.
CPC ............ *H04L 1/0003* (2013.01); *H04L 1/0009* (2013.01); *H04L 1/1867* (2013.01); *H04L 5/0016* (2013.01); *H04L 5/0037* (2013.01); *H04L 5/0046* (2013.01); *H04L 5/0048* (2013.01); *H04L 5/0053* (2013.01); *H04W 28/04* (2013.01); *H04W 52/146* (2013.01); *H04W 52/325* (2013.01); *H04W 72/12* (2013.01)
USPC ......................................................... 370/329

(56) References Cited

U.S. PATENT DOCUMENTS

| | | | | |
|---|---|---|---|---|
| 7,639,660 | B2* | 12/2009 | Kim et al. | 370/343 |
| 7,809,373 | B2* | 10/2010 | Park et al. | 455/436 |
| 7,848,447 | B2* | 12/2010 | Sawahashi et al. | 375/295 |
| RE43,630 | E* | 9/2012 | Michel et al. | 455/70 |
| 2003/0162551 | A1 | 8/2003 | Atarashi et al. | |
| 2003/0235162 | A1* | 12/2003 | Chao et al. | 370/329 |
| 2005/0018642 | A1* | 1/2005 | Nakamura | 370/342 |
| 2006/0160556 | A1* | 7/2006 | Mueller et al. | 455/522 |
| 2006/0291431 | A1* | 12/2006 | Pajukoski et al. | 370/335 |
| 2007/0047493 | A1* | 3/2007 | Park et al. | 370/331 |
| 2007/0058595 | A1* | 3/2007 | Classon et al. | 370/337 |
| 2007/0082620 | A1* | 4/2007 | Zhang et al. | 455/69 |
| 2008/0072269 | A1* | 3/2008 | Malladi et al. | 725/110 |
| 2009/0190534 | A1* | 7/2009 | Yamada et al. | 370/328 |
| 2009/0220017 | A1* | 9/2009 | Kawamura et al. | 375/260 |

FOREIGN PATENT DOCUMENTS

| | | |
|---|---|---|
| DE | 19959179 | 6/2001 |
| EP | 1143666 | 10/2001 |
| JP | 2002-374321 | 12/2002 |
| JP | 2005-051684 A | 2/2005 |

OTHER PUBLICATIONS

Physical Channel Structures for Evolved UTRA, NTTDoCoMo, May 9-13, 2005, 3GPP TSG RAN WG1 R1-050464, pp. 1-13.*
Physical Layer Aspects of Evolved UTRA, 3GPP TR 25.814 V1.1.1, Feb. 2006, 1-85.*
NTT DoCoMo, Physical Channel Structures for Evolved UTRA, May 9-13, 2005, 3GPP TSG-RAN WG1 Meeting # 41 R1-050464.*
Tachikawa, Keiji "Latest Digital Mobile Communication", published by The Science News Ltd., pp. 160-178, Jun. 25, 2001 (46 pages).
"Advanced Digital Mobile Communications" edited by Keiji Tachikawa, The Science News Ltd., published Jan. 2002, pp. 160-178 and partial English translation.
Taiwanese Office Action for patent application No. 95120994, mailed Nov. 18, 2009, and English translation thereof, 13 pages.
Office Action issued in Japanese Patent Application No. 2009-191391 dated Feb. 8, 2011 and partial English translation thereof (8 pages).
English translation of Japanese Laid-Open Patent Application No. 2002-374321 Publication date Dec. 26, 2002 (24 pages).
International Search Report (English) for PCT/JP2006/311875 mailed Sep. 19, 2006, 1 page.
Written Opinion of International Searching Authority (Japanese) mailed Sep. 19, 2006, 3 pages.
"Uplink Multiple Access Scheme for Evolved UTRA" 3GPP TSG RAN WG1 Meeting #40bis, R1-050248, NTT DoCoMo, Mar. 30, 2005, 7 pages.
"Physical Channel Structures for Evolved UTRA" 3GPP TSG RAN WG1 Meeting #41, R1-050464, NTT DoCoMo, May 3, 2005, 13 pages.
Japanese Office Action for Application No. 2006-127988, mailed on Mar. 23, 2010 (6 pages).
Extended European Search Report issued in corresponding European Application No. 06757310.5, mailed on Mar. 13, 2013 (7 pages).
Huawei Technologies, Co. Ltd/CWTS, "Uplink signaling structure for 1.28Mcps TDD HSDPA", TSG-RAN WG1 meeting #24; R1-02-0204; Orlando, FL, USA, Feb. 18 through Feb. 22, 2002; (3 pages).
Office Action issued in corresponding Chinese Application No. 201110303018.5, mailed Aug. 13, 2013 (24 pages).

* cited by examiner

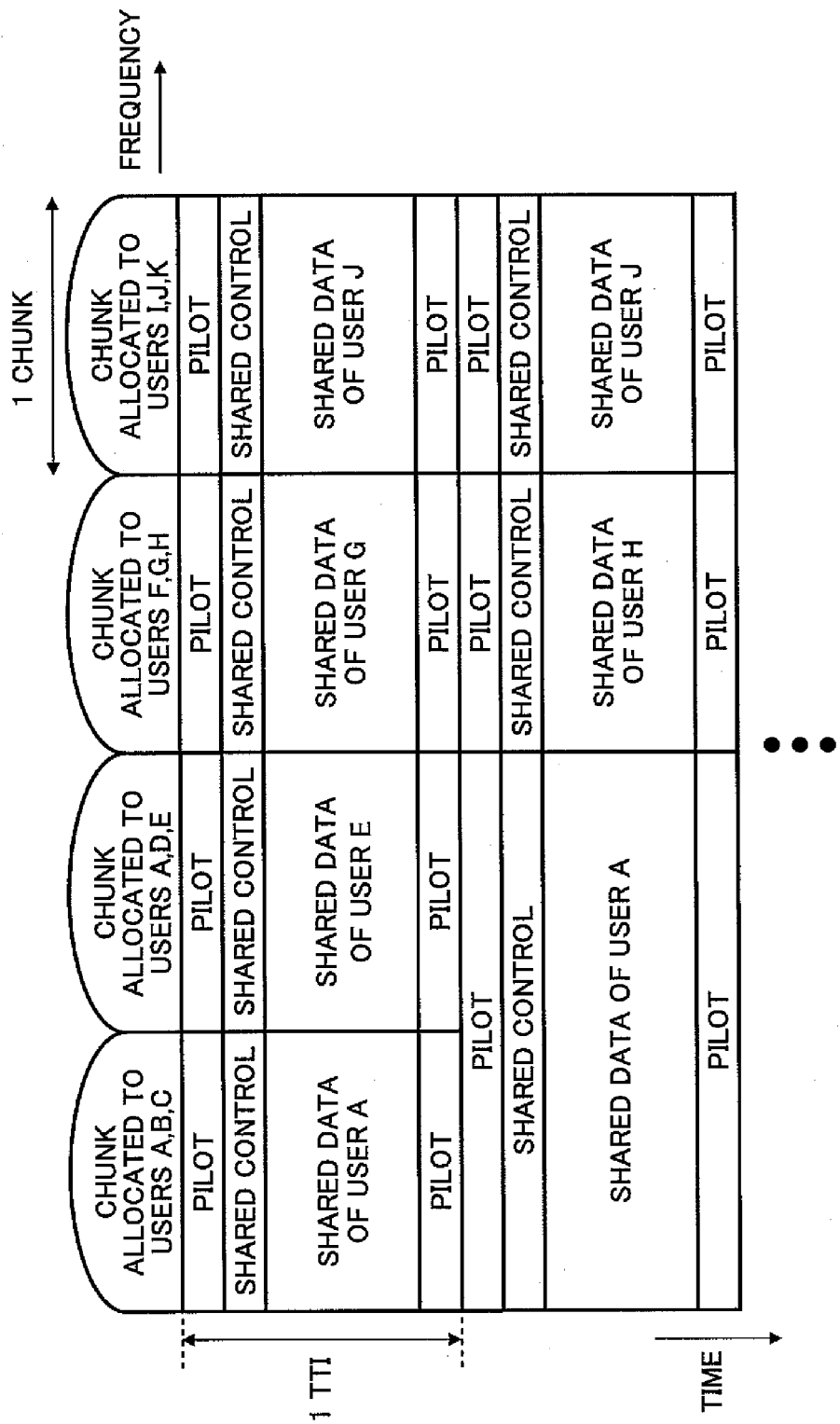

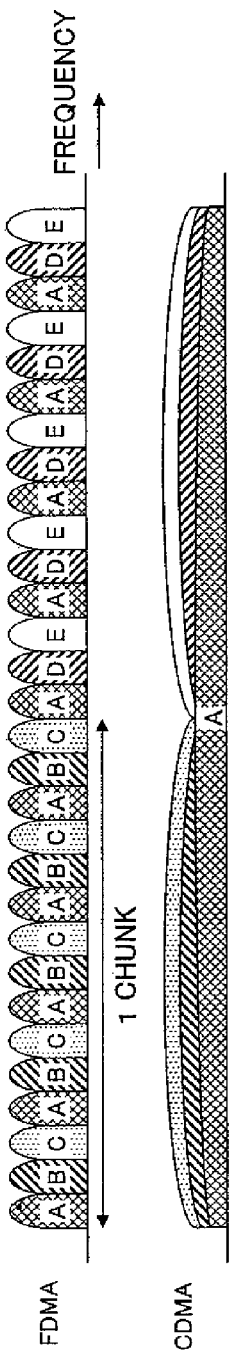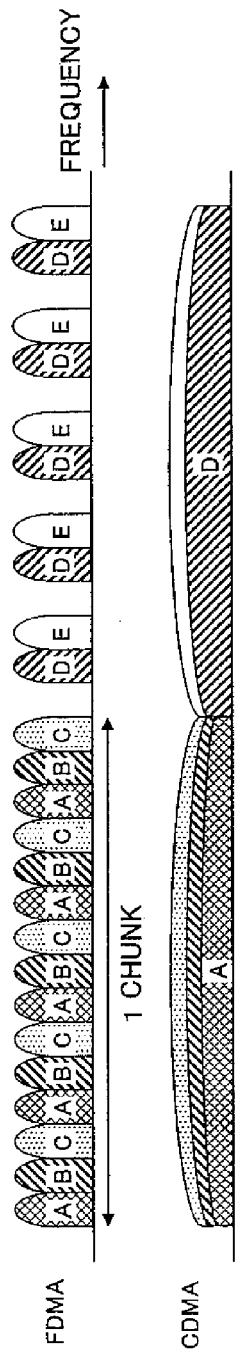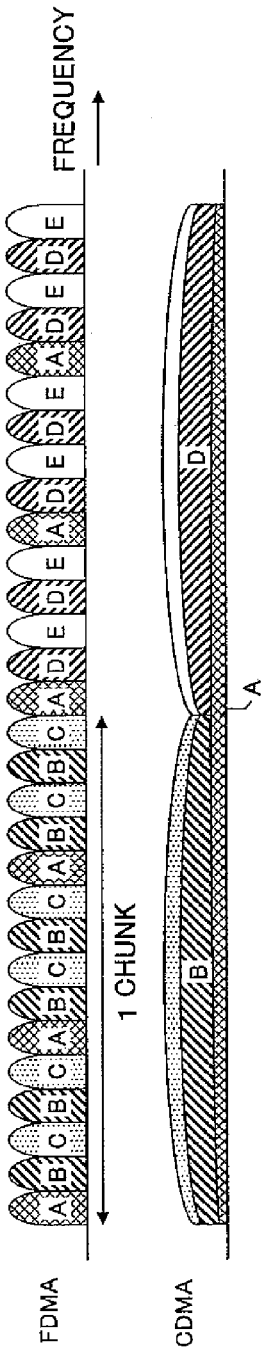
FIG.13A

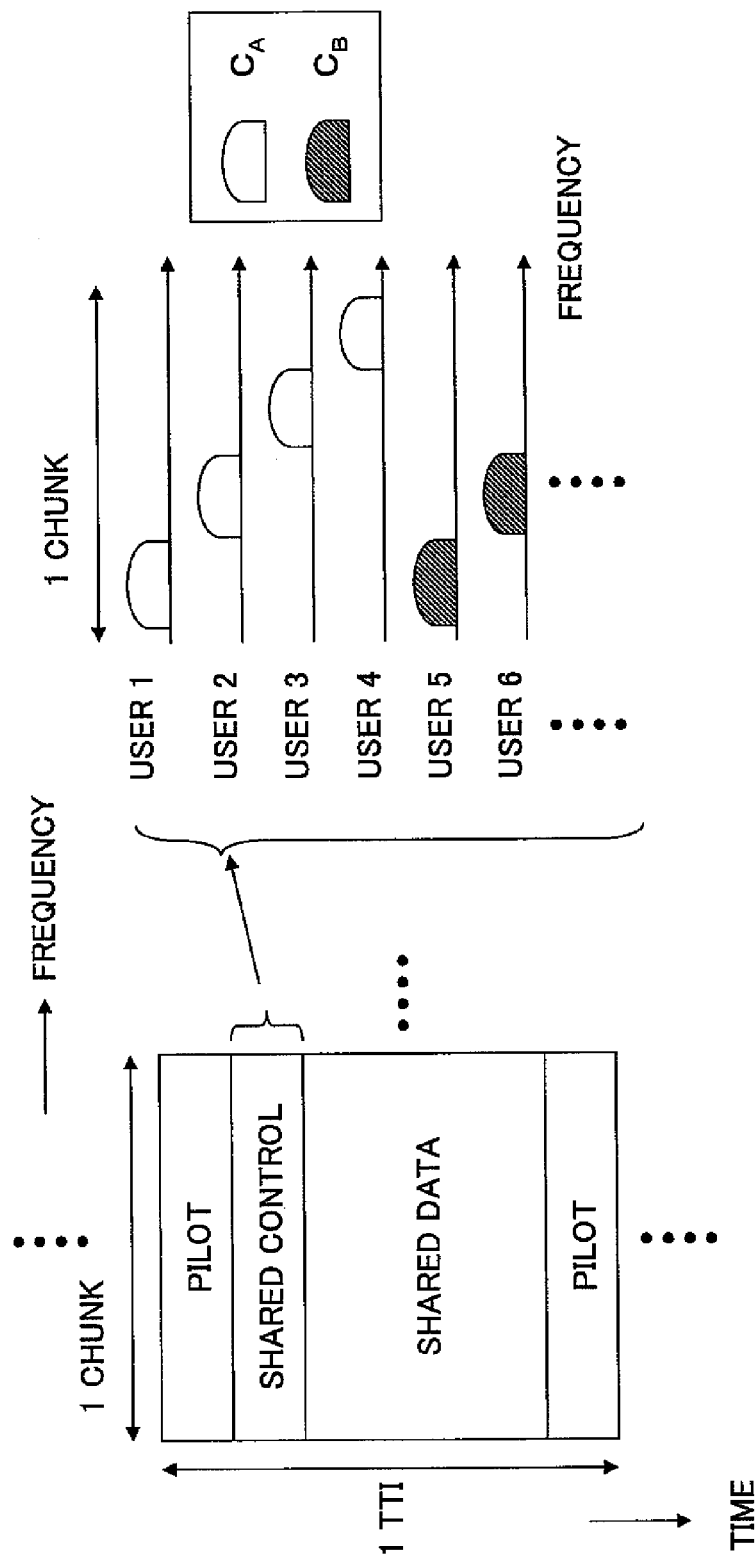

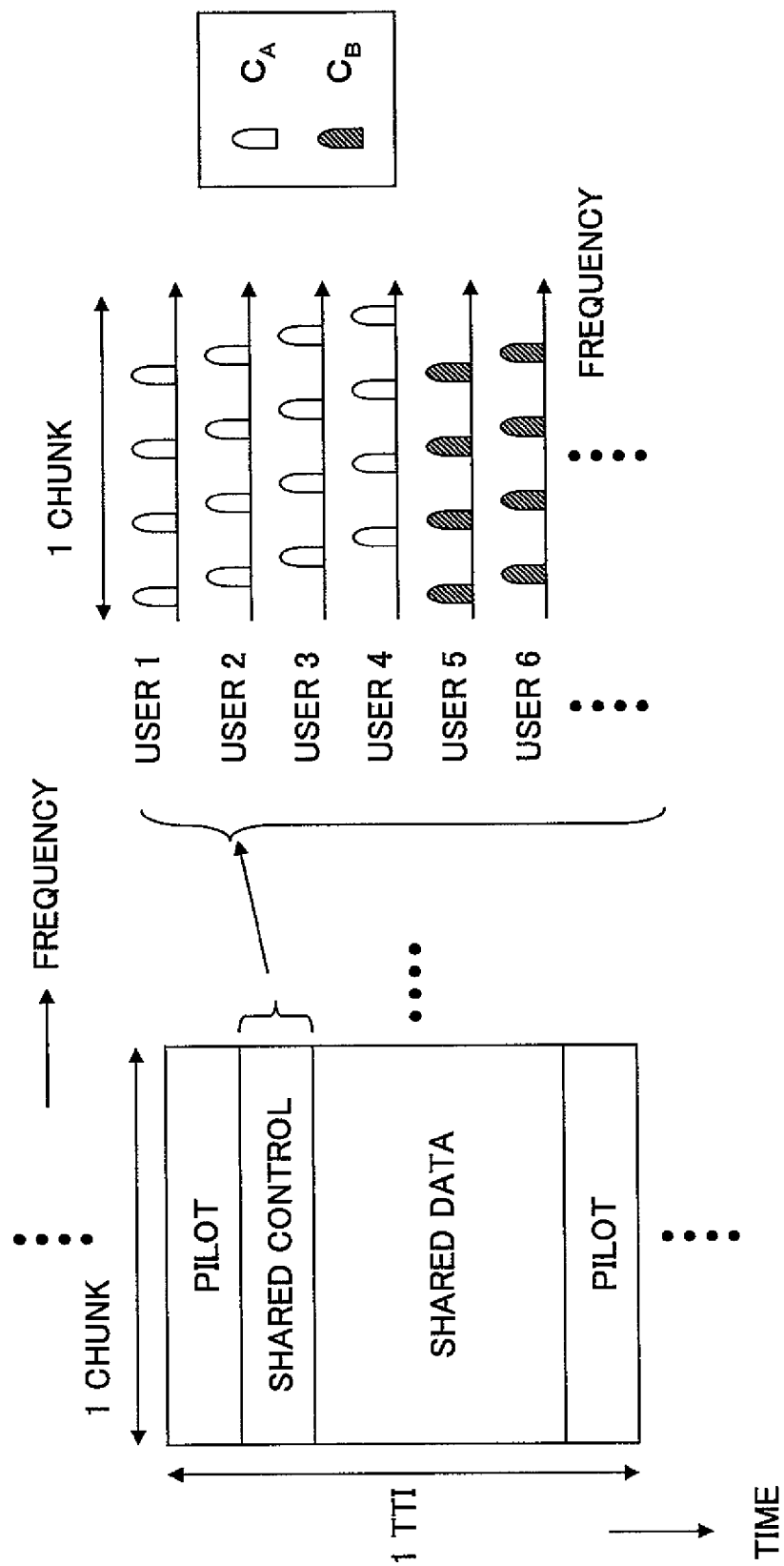

FIG.27

| MCS NUMBER | DATA MODULATION | CHANNEL CODING FACTOR | TRANSMISSION POWER |
|---|---|---|---|
| MCS1 | QPSK | 1/3 | $P_1$ |
| MCS2 | QPSK | 1/2 | $P_2$ |
| MCS3 | QPSK | 2/3 | $P_3$ |
| MCS4 | QPSK | 6/7 | $P_4$ |
| MCS5 | 16QAM | 1/2 | $P_5$ |
| ⋮ | ⋮ | ⋮ | ⋮ |

SMALLER ← THE NUMBER OF CONTROL BITS → LARGER

WORSE ← CQI → BETTER

FIG.32

| CONTROL INFO. | | TPC | ADDITIONAL TPC CONTROL BIT |
|---|---|---|---|
| NECESSARY CONTROL INFO. | | CQI-BASED TPC | UNNECESSARY |
| CONTROL INFO. EXCEPT FOR NECESSARY CONTROL INFO. | ACK/NACK REGARDING DOWNLINK | CQI-BASED TPC (OR OPEN-LOOP TPC) | NECESSARY |
| | CQI REGARDING DOWNLINK | OPEN-LOOP TPC | NECESSARY |
| | | CQI-BASED TPC | UNNECESSARY |
| | SCHEDULING CHANGE FOR UPLINK | OPEN-LOOP TPC | NECESSARY |
| | | CQI-BASED TPC | UNNECESSARY |

FIG.33B

| RECEPTION QUALITY (CQI) | DATA MODULATION (MCS) | CHANNEL CODING FACTOR (MCS) | TRANSMISSION PERIOD ($T_{L1L2}$) |
|---|---|---|---|
| BETTER ↕ WORSE | HIGH | HIGH | SHORT |
| | HIGH | LOW | SHORT |
| | LOW | HIGH | SHORT |
| | LOW | LOW | SHORT |
| | LOW | LOW | LONG |

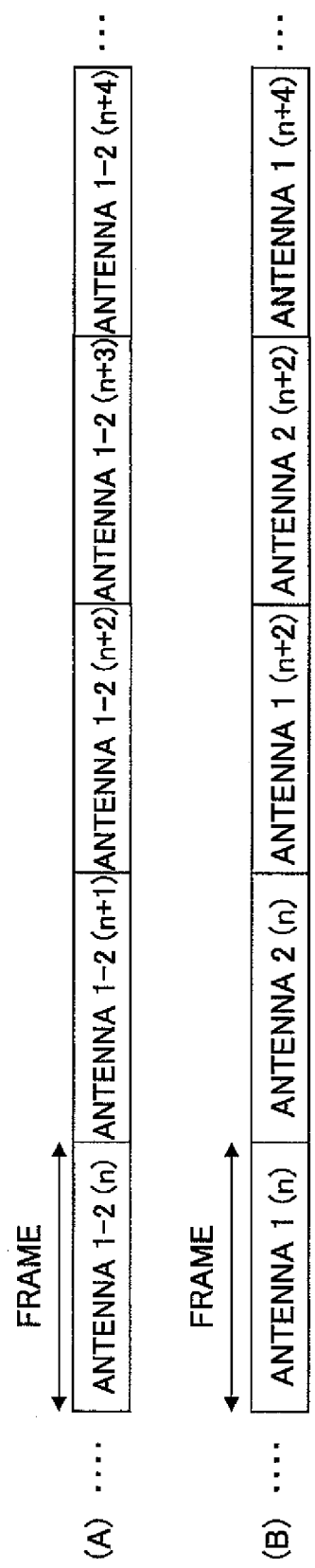

MOBILE STATION, BASE STATION AND COMMUNICATIONS METHOD

TECHNICAL FIELD

The present invention relates generally to radio communications, specifically to a mobile station, a base station, and a communications method which are usable in a packet switching mobile communications system.

BACKGROUND ART

A conventional mobile communications system employs a line switching type communications method, where a dedicated channel is allocated to a user. Such a method is suitable for a system which focuses on an interactive service of voice, moving image, or the like (See Non-patent Publication 1, for example) However, since traffic will be transmitted in a bursty manner as IP packets due to implementation of the Internet Protocol (IP) in a core network of future mobile communications systems, packet transmission is desirable also in radio transmission. In addition, when packet transmission is implemented in the radio transmission, delay in the radio transmission needs to be reduced, required transmission power needs to be reduced, and link capacity needs to be increased, for example. Moreover, error reduction in the radio transmission and highly reliable packet transmission are taken into consideration.

Non-patent Document 1: "Advanced Digital Mobile Communications", edited by Keiji Tachikawa, Kagaku-shimbun-sha., published in January 2002, pp. 160-178.

SUMMARY OF INVENTION

Problem to be Solved by the Invention

The present invention is directed toward provision of a mobile station, a base station, and a communications method that can increase uplink information transmission efficiency in a packet transmission-based mobile communications system.

Means for Solving the Problem

In one embodiment of the present invention, there is used a mobile station that includes a multiplexing portion that multiplexes a contention-based channel and a non-contention-based channel, and a transmitting portion that transmits the multiplexed contention-based and non-contention-based channels to a base station. The contention-based channel is not required to be scheduled before transmission in the base station, whereas the non-contention-based channel is required to be scheduled before transmission in the base station. The contention-based channel includes one or more of a fast access channel, a reservation channel, and a synchronization channel. The non-contention-based channel includes one or more of an uplink shared data channel and an uplink shared control channel. The fast access channel includes traffic data, or control data having a data size smaller than a predetermined size, or a combination thereof. The reservation channel includes information to request scheduling the non-contention-based channel. The uplink data channel includes the traffic data, or the control data, or a combination thereof.

Advantage of the Invention

According to the present invention, uplink information transmission efficiency can be increased in a packet transmission-based mobile communications system.

BRIEF DESCRIPTION OF THE DRAWINGS

FIG. 12 shows an example of mapping various channels;

FIG. 13A shows an example of multiplexing the pilot channel and a shared control channel;

FIG. 13B shows a way where uplink shared control channels of plural users are multiplexed by a localized FDMA method and a CDMA method;

FIG. 13C shows a way where uplink shared control channels of plural users are multiplexed by a distributed FDMA method and a CDMA method;

FIG. 27 shows a corresponding relationship between an MCS number and transmission power;

FIG. 32 shows an example of a combination of control information and a transmission power control method;

FIG. 33B shows an example of a corresponding relationship between radio parameters; and FIG. 34 shows an example of a transmission method of the shared control channel from each transmission antenna.

Figure 1:
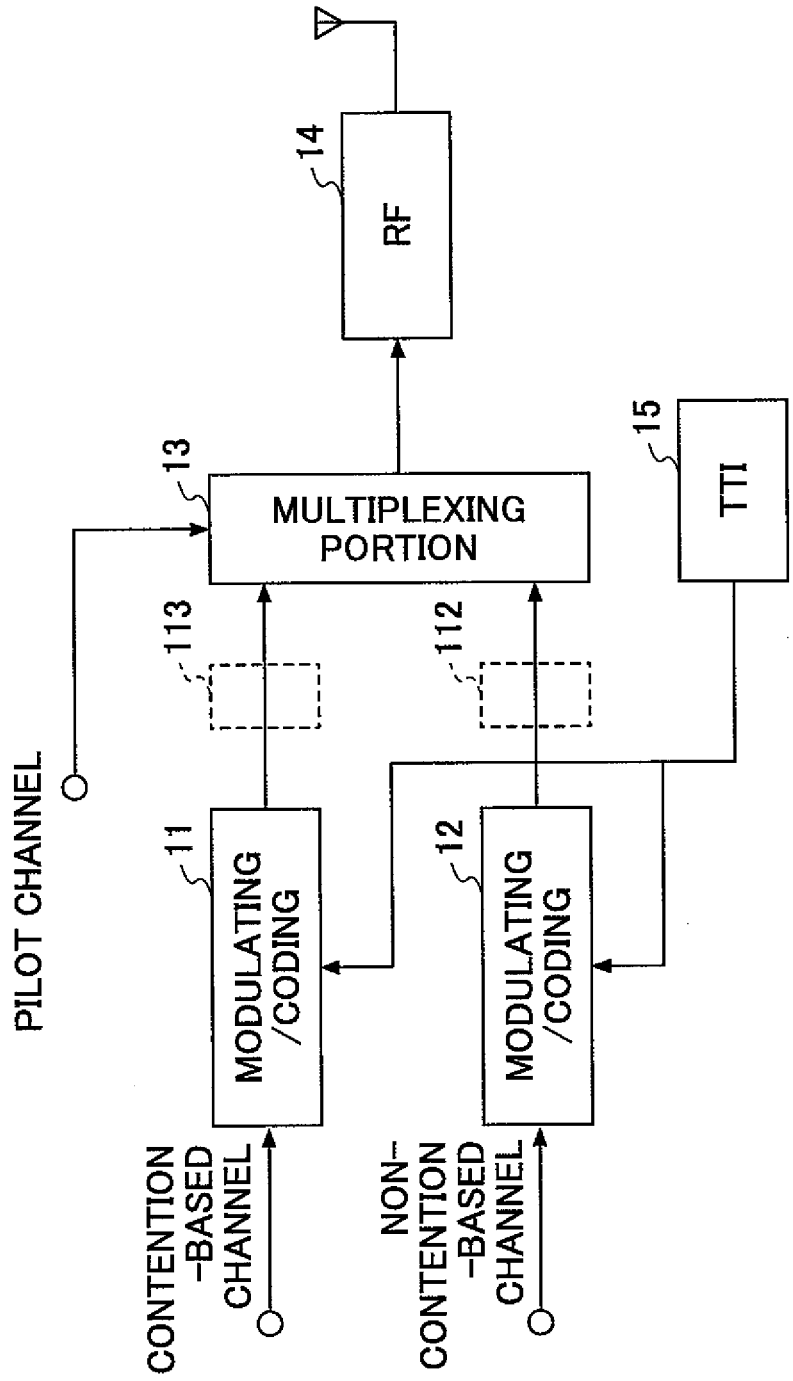
FIG. 1 is a schematic block diagram of a transmitter according to an example of the present invention.

LIST OF REFERENCE SYMBOLS 11, 12: modulating and coding portion
13: multiplexing portion
14: radio transmission portion
15: TTI control portion
113, 115: spreading portion
21: radio transmission portion
22: demultiplexing portion
23, 24: demodulation and decoding portion
25: TTI control portion
223, 224: despreading portion
1602: code multiplying portion
1604: repetitive combining portion
1606: phase shift portion
1702: phase shift portion
1704: repetitive combining portion
1706: despreading portion
231: pilot channel generation portion
232: contention-based channel generation portion
234: shared control channel generation portion
236, 241: discrete Fourier transformation portion
237, 242: mapping portion
238, 243: inverse fast Fourier transformation portion
244: demultiplexing portion
251-253: switch
255-258: modulating and coding portion
259: multiplexing portion

BEST MODE FOR CARRYING OUT THE INVENTION

In one embodiment of the present invention, a contention-based channel and a non-contention-based channel are multiplexed and the multiplexed contention-based and non-contention-based channels are transmitted to a base station. While high-speed communications are realized by the contention-based channel, appropriately scheduled communications are also realized by the non-contention-based channel.

Multiplexing plural of the contention-based channels corresponding to plural users may include frequency multiplexing and a combination of the frequency multiplexing and code multiplexing. By using a wide frequency bandwidth, a frequency diversity effect can be obtained, thereby realizing high quality signal transmission with reduced transmission delay.

An uplink frequency band may be divided into plural frequency blocks, each of which includes one or more carrier waves, and one or more frequency blocks may be used to transmit the contention-based channel and the non-contention-based channel.

A synchronization channel may be less frequently transmitted than the fast access channel.

The uplink shared control channel may include one or more pieces of control information associated with a scheduled uplink shared data channel, control information associated with a scheduled downlink shared data channel, control information for changing the uplink data channel scheduling, and control information for scheduling the downlink shared data channel.

The uplink shared data channel may be transmitted preferentially to a mobile station having a high quality transmission path (transmission channel), which is different from the uplink control channel.

A pilot channel, the uplink shared control channel, the uplink shared data channel, and another pilot channel are time-multiplexed and transmitted in a unit transmission time interval.

The uplink shared control channel may be multiplexed by the frequency-multiplexing method, the code-multiplexing method, or a combination of the two methods, for two or more users.

EXAMPLE 1

Examples according to the present invention will be described below. Specific values are used only for illustrative purpose; those specific values do not limit the present invention, unless otherwise noted; various values may be used to practice the present invention.

FIG. 1 shows a transmitter according to a first example of the present invention. The transmitter is provided typically in a mobile station as described in this example. The transmitter includes modulating and coding portions 11, 12, a multiplexing portion 13, a radio transmission portion (RF) 14, and a transmission time interval (TTI) control portion 15.

The modulating and coding portions 11, 12 perform channel coding on data input to the portions 11, 12, and multilevel modulation on the coded data so as to output the modulated data. Channel coding rates and levels (modulation orders) of the multilevel modulation may be different depending on types of signals input to the portions 11, 12. In the illustrated example, the contention-based channel and the non-contention-based channel are indicated as the input signals. Generally, the contention-based channel does not need to be scheduled by a base station before transmission, whereas the non-contention-based channel needs to be scheduled by the base station before transmission, as described in detail below. The non-contention-based channel may be referred to as a scheduled channel. The scheduling in this case means that the base station plans to allocate resources (frequencies, codes, or the like) to be used for signal transmission by the corresponding mobile stations.

The multiplexing portion 13 multiplexes the coded and modulated data. A pilot channel may also be multiplexed depending on circumstances. The multiplexing may include time-multiplexing, frequency-multiplexing, or a combination thereof.

The radio transmission portion (RF) 14 processes the multiplexed data so as to transmit the data through an antenna.

The transmission time interval control portion 15 determines a transmission time interval (TTI) depending on necessity (or, for example, in accordance with notification from the base station) and notifies the modulating and coding portions 11, 12 or the like of the determined TTI.

By the way, when code-spreading is employed, a spreading portion 113 is provided between the modulating and coding portion 11 and the multiplexing portion 13; and a spreading portion 112 is provided between the modulating and coding portion 12 and the multiplexing portion 13.

Figure 2:
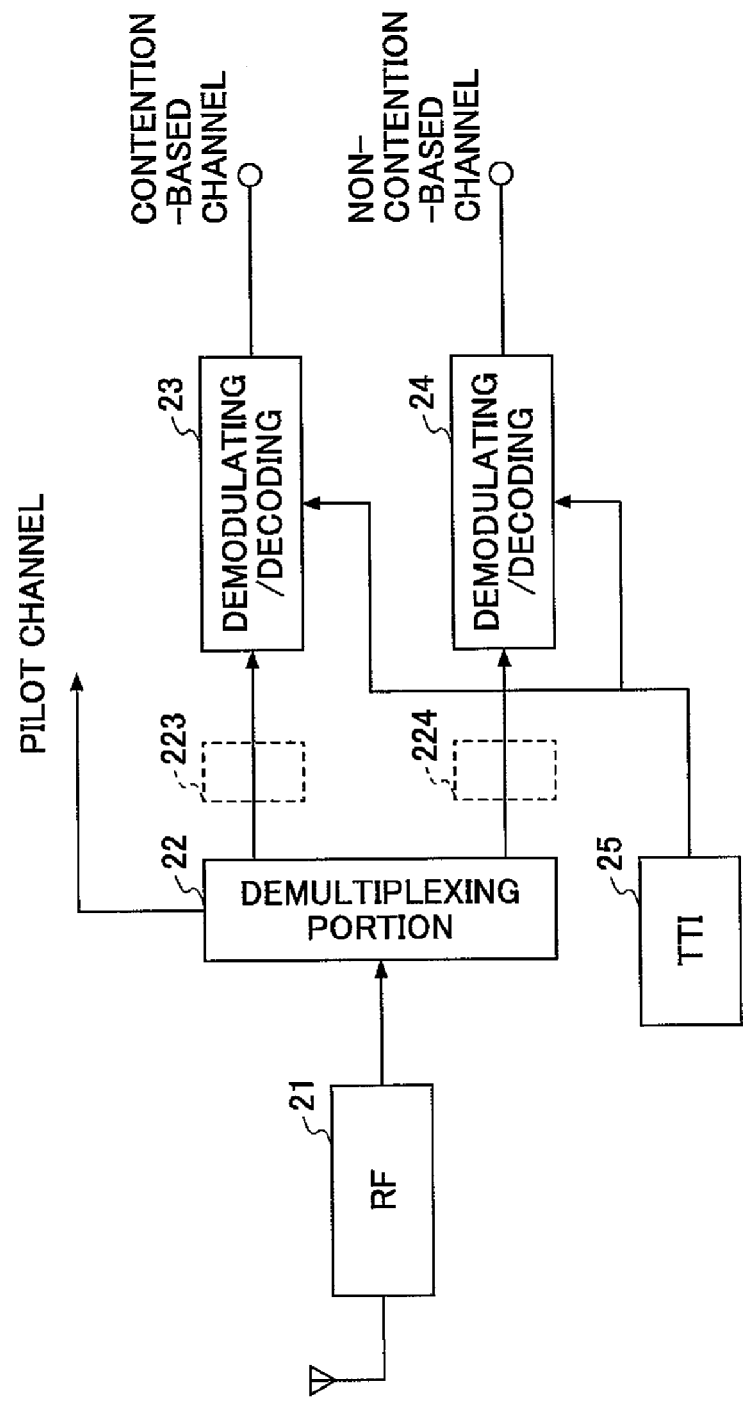
FIG. 2 is a schematic block diagram of a receiver according to an example of the present invention.

FIG. 2 shows a receiver according to this example of the present invention. The receiver is provided typically in the base station as described in this example. The receiver includes a radio transmission portion (RF) 21, a demultiplexing portion 22, demodulating and decoding portions 23, 24, and a transmission time interval control (TTI) portion 25.

The radio frequency (RF) portion 21 processes a radio signal received from an antenna so as to convert the received signal into base-band data.

The demultiplexing portion 22 demultiplexes the contention-based channel and the non-contention-base channel from the received signal. When the pilot signal is included in the received signal, the demultiplexing portion 22 demultiplexes the pilot signal from the received signal.

The demodulating and decoding portions 23, 24 perform a demodulating process, which corresponds to the multilevel modulation performed by the transmitter, and a decoding process, which corresponds to the channel-coding performed in the transmitter, on the contention-based channel and the non-contention-based channel.

The transmission time interval control portion 25 adjusts the transmission time interval (TTI) to be used in communications.

By the way, when code-spreading is performed, a despreading portion 223 is provided between the demultiplexing portion 22 and the demodulating and coding portion 23, and a despreading portion 224 is provided between the demultiplexing portion 22 and the demodulating and coding portion 24.

The contention-based channel and the non-contention-based channel to be transmitted from the mobile station undergo the channel-coding and the modulating processes, and are multiplexed and converted to a radio signal so as to be transmitted. In the base station, the radio signal is converted into the base-band signal, and demultiplexed into the contention-based channel and the non-contention-based channel. As a result, each of the transmitted channels is obtained. The base station uses the pilot channel, which is transmitted when necessary, so as to perform channel compensation for the received signal, or the like.

In this example, uplink signal transmission is carried out based on a single-carrier transmission method. Therefore, Peak to Average Power Ratio (PAPR) can be relatively reduced in contrast to a multi-carrier transmission method. For the uplink signal transmission may be used Time Division Multiplexing (TDM), Frequency Division Multiplexing (FDM), Code Division Multiplexing (CDM), or any combination of the three.

Figure 3:
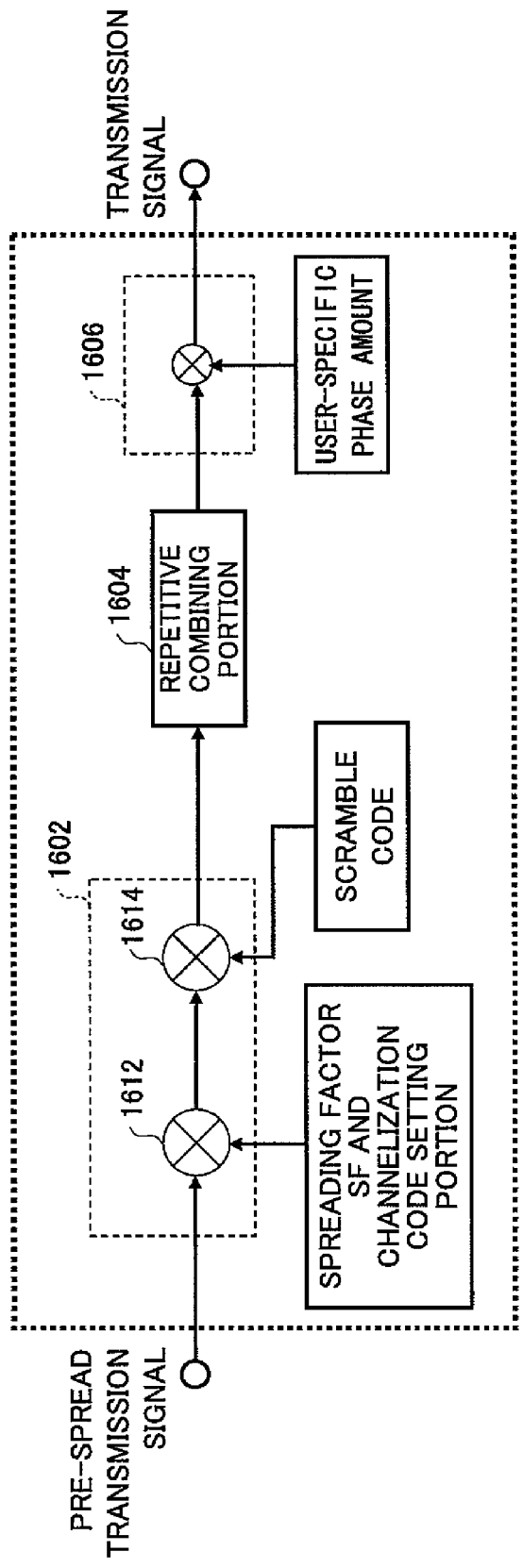
FIG. 3 is a block diagram of a spreading portion to be used in a VSCRF-CDMA-based transmitter.
Figure 4:
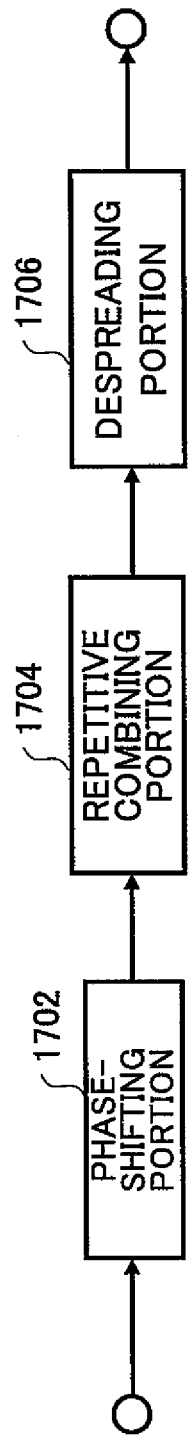
FIG. 4 is a block diagram of a despreading portion to be used in a VSCRF-CDMA-based receiver.

The single-carrier-based radio transmission can be realized by various ways. For example, Direct Sequence Code Division Multiple Access (DS-CDMA) or Variable Spreading Chip Repetition Factors Code Division Multiple Access (VSCRF-CDMA) may be used. In the VSCRF-CDMA, the spreading portions to be provided at the places indicated by the reference numerals 112, 113 may be configured as shown in FIG. 3. In addition, the despreading portions to be provided at the places indicated by reference numerals 223, 224 may be configured as shown in FIG. 4.

FIG. 3 shows a block diagram of a spreading portion to be used in a VSCRF-CDMA-based transmitter. The spreading portion includes a code multiplying portion 1602, a repetitive combining portion 1604, and a phase-shift portion 1606.

The code multiplying portion 1602 multiplies a transmission signal by a spreading code. In FIG. 3, a multiplier 1612 multiplies the transmission signal by a channelization code determined under a predetermined code spreading factor. In addition, a multiplier 1614 multiplies the transmission signal by a scrambling code. The code spreading factor SF may be determined in accordance with the communications environment.

The repetitive combining portion 1604 compresses the spread transmission signal in a time direction and performs chip repetition a predetermined number of times (CRF times). When the repetition number CFR is equal to one, the repetitive combining portion 1604 has the same configuration and operations as the usual Direct Sequence-CDMA (DS-CDMA) method. However, in the case of CRF=1, a phase shift in the phase shift portion 1606 is not necessary.

The phase shift portion 1606 deviates (or shifts) a phase of the transmission signal by a predetermined frequency. The shifting amount is set specifically for each mobile station.

FIG. 4 shows a block diagram of a despreading portion to be used in a VSCRF-CDMA-based receiver. The despread portion includes a phase shift portion 1702, a repetitive combining portion 1704, and a code despreading portion 1706.

The phase shift portion 1702 multiplies a received signal by the shifting amount set specifically for each mobile station and demultiplexes the received signal into signals corresponding to the mobile stations.

The repetitive combining portion 1704 extends (decompresses) the repeated data in the time direction so as to obtain the decompressed data.

The code despreading portion 1706 performs despreading by multiplying the received signal by the spreading codes of each mobile station.

Figure 5:
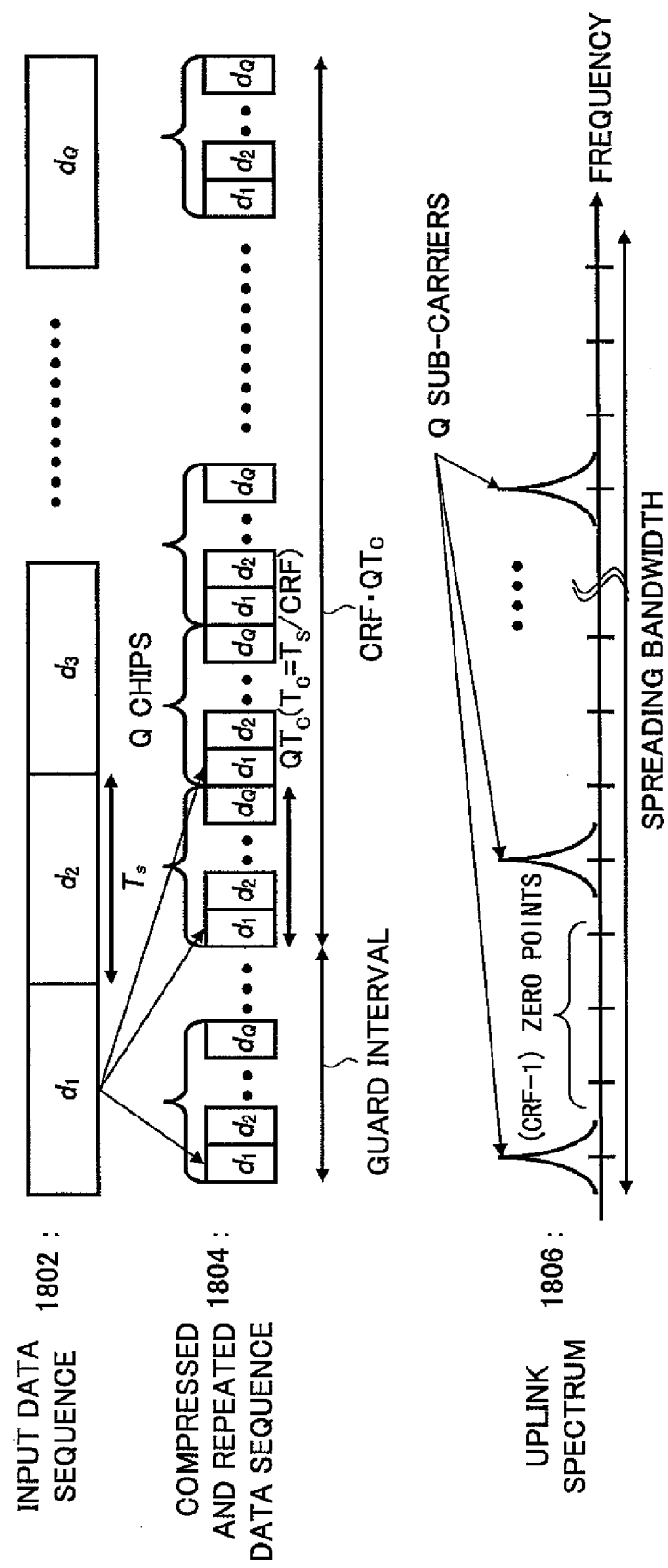
FIG. 5 is an explanatory view for explaining principle of operations of a VSCRF-CDMA method.

FIG. 5 is an explanatory view for explaining primary operations in the VSCRF-CDMA method. For simplicity of explanation, a certain group of code-spread data sequences is expressed by $d_1, d_2, \ldots, d_Q$, and a time period of each data element $d_i$ ($i=1, \ldots, Q$) is expressed by $T_s$. One data element $d_i$ may be associated with one symbol or any other appropriate information unit. This group of the signal sequences has a total time period of $T_s \times Q$. The signal sequence 1802 corresponds to an input signal to the repetitive combining portion 1604. This signal sequence 1802 is converted so that the signal sequence 1802 is compressed in the time direction by a factor of 1/CRF and the compressed signal is repeated over the time period of $T_s \times Q$. The converted signal sequence is indicated by "1804" in FIG. 5. FIG. 5 also shows a time period of a guard interval. The compression in the time direction can be performed, for example, by using a frequency that is CRF times higher than the clock frequency used for the input signal. With this, the time period of each data element $d_i$ is compressed to $T_s/\text{CRF}$ (but repeated CRF times). The compressed and repeated signal sequence 1804 is output from the repetitive combining portion 1604, input to the phase shift portion 1606, shifted by a predetermined shifting amount, and then output from the phase shift portion 1606. The shifting a mount is set for each mobile station, and set so that uplink signals corresponding to the mobile stations are orthogonal with each other in the frequency axis.

A frequency spectrum of the uplink signal is generally shown by "1806" in FIG. 5, in which a bandwidth indicated by a spreading bandwidth could have been occupied by the spread signal sequence 1802 (the input signal at the repetitive combining portion 1604) if the spread signal sequence 1802 were transmitted without being compressed and repeated. A frequency spectrum of the compressed and repeated signal (the output signal of the repetitive combining portion 1604) has plural frequency components arranged in a shape of comb. Such a spectrum is common to all the mobile stations. By shifting the spectra by a shifting amount specific to the corresponding mobile stations, the frequency components of the corresponding mobile stations can be orthogonal with one another. The compression in the time direction, the repetition, and the phase shift can spread the signals corresponding to the mobile stations discretely in a comb-like shape over the entire frequency band and arrange the comb-shaped frequency spectra on the frequency axis so as to be orthogonal with one another.

The receiver performs the operations opposite to the transmitter. Namely, a user-specific phase is given to the received signal in the phase shift portion 1702 and then the signal is input to the repetitive combining portion 1704. The input signal is decompressed in the time direction, and the decompressed signal is converted to the spread signal sequence, which is in turn output from the repetitive combining portion 1704. The despreading portion 1706 multiplies the input signal by a predetermined spreading code so as to despread the input signal.

Figure 6:
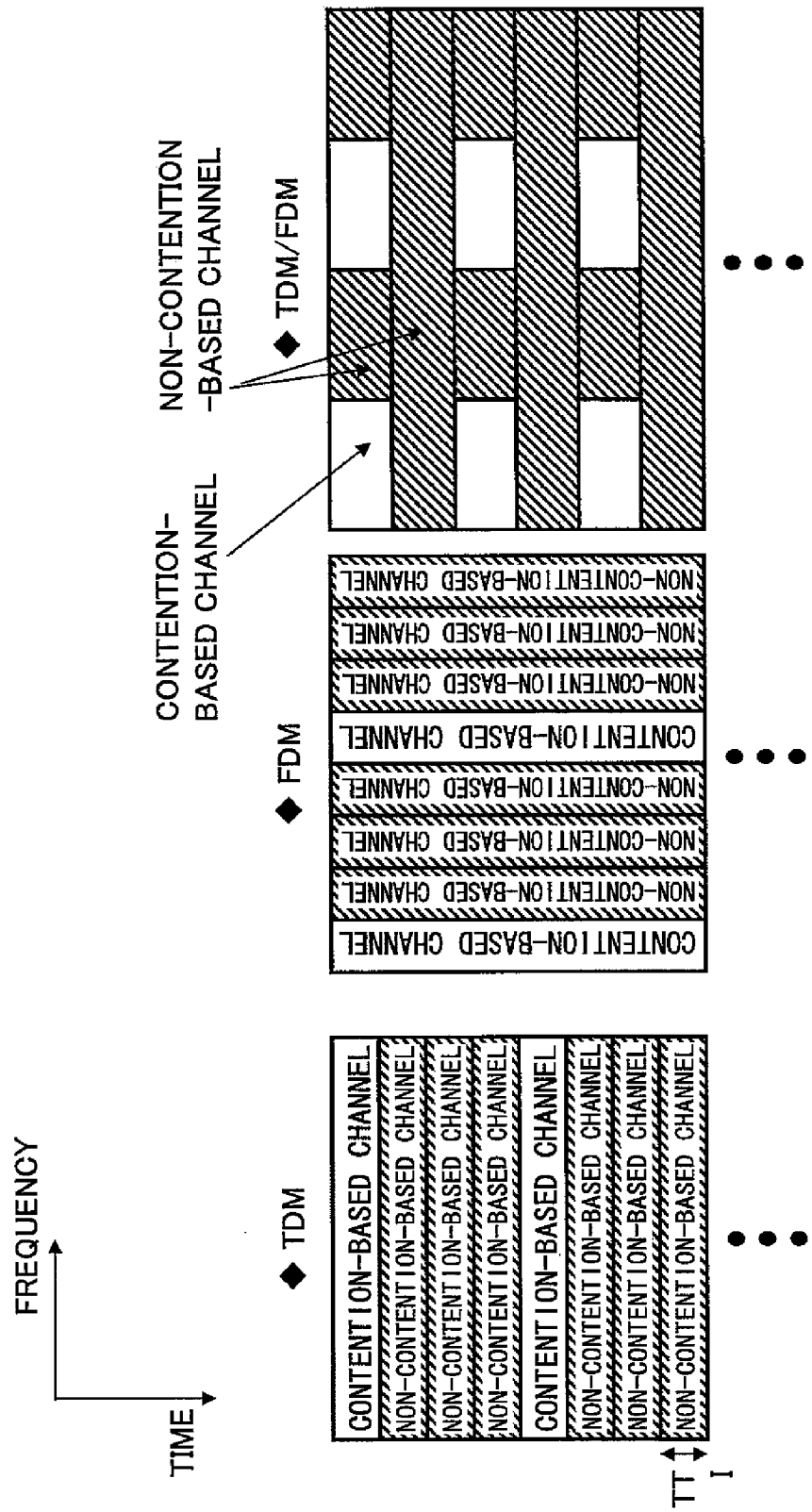
FIG. 6 shows examples of multiplexing a contention-based channel and a non-contention-based channel.

FIG. 6 shows examples of multiplexing the contention-based channels and the non-contention-based channels. In an example indicated by "TDM", these channels are time-multiplexed. While a minimum unit of the time-multiplexing is a time period corresponding to one TTI in the illustrated example, any other time period may be employed. In another example indicated by "FDM", the two channels are frequency-multiplexed. Frequency blocks shown in this example are called a chunk, a frequency chunk, or a resource block. Generally, one chunk may include one or more carriers, which may also be referred to as sub-carriers. However, since a single carrier method is employed in one example of the present invention, one chunk includes only one carrier. In yet another example indicated by "TDM/FDM", the contention-based channels and the non-contention-base channels are multiplexed in both the time direction and the frequency direction. The frequency band used in a system is divided into plural frequency blocks, each one of which may be defined as a unit of resource allocation, packet retransmission, or the like. In these cases, multiplexing is appropriately performed every frequency block that is allowed to be used by the user. The transmitter shown in FIG. 1 can perform various multiplexing methods including the three types of multiplexing shown in FIG. 6 by the multiplexing portion 13, the radio transmission portion 14 and/or the spreading portions 112, 113. The receiver shown in FIG. 2 can appropriately demultiplex the multiplexed signal by the radio transmission portion 21, the demultiplexing portion 22 and/or the despreading portion 223, 224.

Various channels transmitted in uplink are described in the following. These channels are categorized mainly into (A) the contention-based channel, (B) the non-contention-based channel, and (C) the pilot channel. The contention-based channel does not need to be scheduled by a base station before transmitted, whereas the non-contention-based channel needs to be scheduled by the base station before transmitted. The contention-based channel includes one or more of (A1) a fast access channel, (A2) a reservation channel, and (A3) an uplink synchronization channel. The non-contention-based channel includes one or more of (B1) an uplink shared data channel and (B2) an uplink shared control channel.

(A) Contention-Based Channel

The contention-based channel, which is transmitted from the mobile station without being scheduled by the base station, can be transmitted by the mobile station at any time. The contention-based channel is desirably transmitted over a wide frequency band, which allows for a shorter transmission time. In addition, even if signal quality is degraded at a part of the frequency band, a frequency diversity effect is obtained due to such a wide frequency band, and power ramping or the like to compensate for the degradation of the signal quality is not necessary. While contention may be caused between the users, the contention-based channel can easily realize high speed communications. While the Time Division Multiple (TDM) method may be used, as is the case with the current UTRA, the Frequency Division Multiple (FDM) method and/or the Code Division Multiple (CDM) method are employed from the viewpoint of reducing contention with other users. However, once contention is caused between users, these users can retransmit the contention-based channel, if desired. The Frequency Division Multiple Access (FDMA) method may be a localized FDMA method in which one continuous narrow band is allocated to one user, or a distributed FDMA method in which the spectrum is composed of frequency components arranged at predetermined intervals. The frequency components are usually regularly-spaced but may be irregularly-spaced. The distributed FDMA may be realized by the VSCRF-CDMA method, for example.

(A1) Fast Access Channel

The fast access channel may include a control message of small data size, traffic data of small data size, or both. One of the reasons of the small data size is to shorten a transmission delay. The control message may include, for example, information on layer-3 handover. The traffic data of small data size may include, for example, an e-mail having a small volume of information, game commands, or the like. Since the fast access channel can be transmitted from the mobile station to the base station without any reservations, it only takes a short process time for the transmission. The fast access channel is transmitted by one or more frequency channels allocated in advance. The mobile station may be notified which frequency chunk among the plural frequency chunks should be used to transmit the fast access channel, through a downlink broadcast channel by the base station. The notification may be that a specific one frequency chunk among specific plural frequency chunks is to be used, or one or more frequency chunks among specific plural frequency chunks are to be used. Use of more than one frequency chunk is advantageous in that the rate of contention occurring between users can be lower than when using only one specific frequency chunk.

Figure 7:
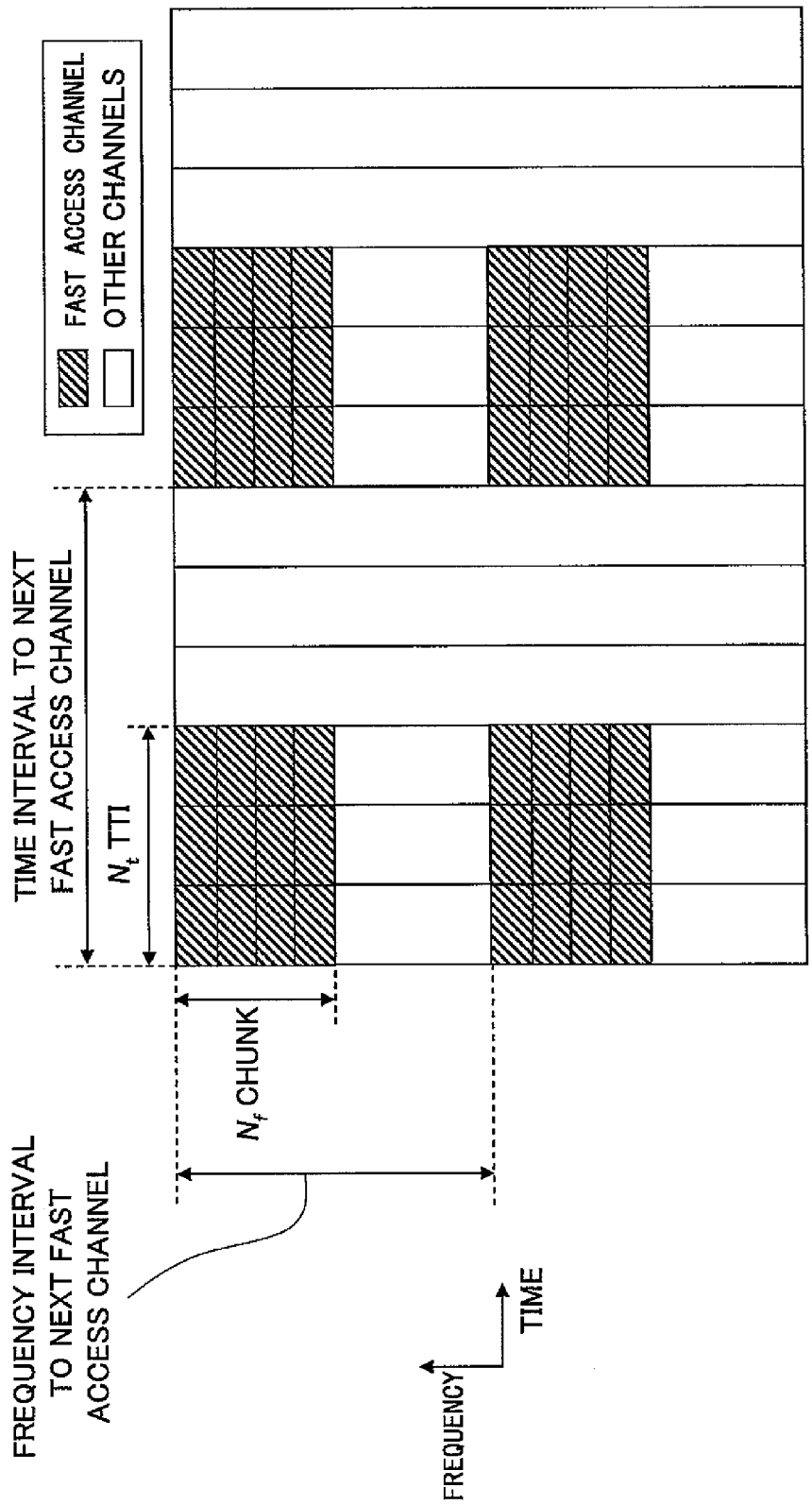
FIG. 7 shows an example of mapping a fast access channel.

FIG. 7 shows a mapping example of the fast access channel. In the illustrated example, $N_f$ frequency chunks and $N_t$ TTIs are allocated to the fast access channel.

(A2) Reservation Channel

Figure 8:
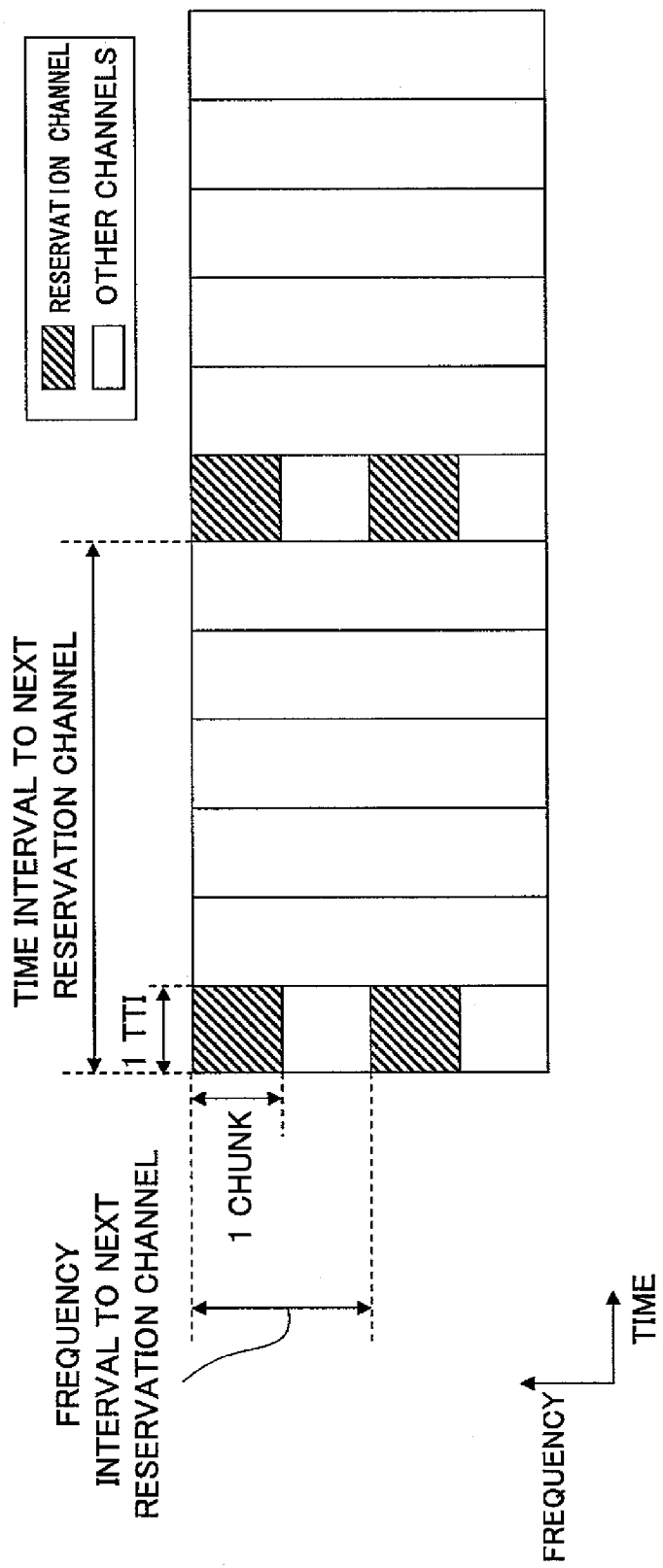
FIG. 8 shows an example of mapping a reservation channel.

The reservation channel includes information to request scheduling the non-contention-based channels. The information may include identification information to identify a mobile station, types of traffic data (voice, image, or the like), a data size, required quality information (QoS, or the like), transmission power of the mobile station, or the like. The reservation channel is transmitted also by the frequency chunk (or chunks) allocated in advance. The mobile station may be notified of which frequency chunk among the plural frequency chunks should be used to transmit the reservation channel, through the downlink broadcast channel by the base station. The reservation channel is preferably transmitted by a minimum unit of resource allocation (one frequency chunk and one TTI) as shown in FIG. 8.

(A3) Uplink Synchronization Channel

Figure 9:
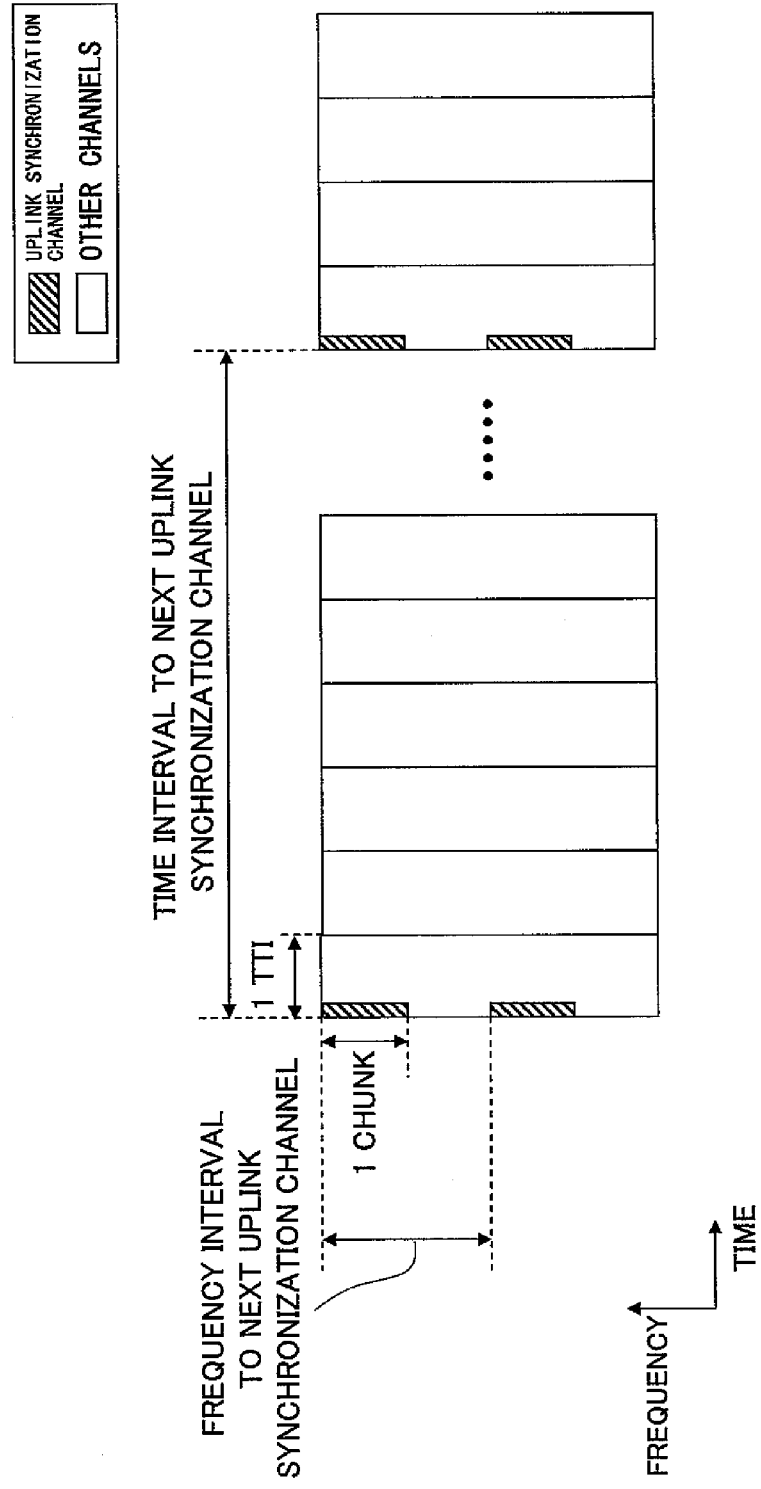
FIG. 9 shows an example of mapping an uplink synchronization channel.

In the example of the present invention, the uplink signal transmission is carried out by the single-carrier method, in which equalization is carried out in order to suppress multipath interference. It is preferable to maintain synchronization so that reception timing of the received signals from various users falls within a predetermined guard interval, in order to carry our effective equalization. The uplink synchronization channel is used for synchronization. The mobile station transmits plural symbols including an active symbol portion and a guard interval portion in a predetermined transmission interval time (TTI). The base station removes the guard interval portion from a received signal from each mobile station and demodulates the content of the active symbol portion. The signals received in synchronization are demultiplexed into the signals corresponding to the mobile stations by an appropriate signal demultiplexing algorithm. The guard interval portion may be generated by any appropriate method such as a cyclic prefix (CP) method and a zero-padding method. The uplink synchronization channel is transmitted by one or more frequency chunks allocated in advance. However, since updating the synchronization timing is not necessarily performed every TTI, the uplink synchronization channel is transmitted relatively less frequently, as shown in FIG. 9. In addition, it does not take one TTI to transmit the uplink synchronization channel in many cases, although it depends on the data size of the synchronization channel.

By the way, reception timing can also be synchronized using the pilot channel described below. Therefore, the synchronization channel and the pilot channel are not necessarily always prepared.

(B) Non-Contention-Based Channel

The non-contention-based channel is transmitted in accordance with scheduling performed by the base station.

(B1) Uplink Shared Data Channel

The uplink shared data channel includes either one of traffic data and a control message of layer 3, or both. The control message may include information on handover, information necessary for retransmission, or the like. To the uplink shared data channel is allocated one or more frequency chunks in accordance with scheduling in the time domain, or in the time and the frequency domains. In this case, resource allocation is planned (scheduled) in the time domain, or in the time and the frequency domains, by the base station so that a user related to a better transmission path (channel) can preferentially transmit packets. The number of frequency chunks to be allocated is determined depending on a data rate, a data size, or the like of the packets which the mobile station is to transmit. When there are plural users that require a relatively low data rate, one chunk may be shared by the plural users. On the other hand, when a traffic size for a certain user exceeds a predetermined size, one chunk may be used exclusively by the user, or plural chunks may be used by the user. When one chunk is shared by plural users, any kind of multiplexing is performed so that the channels of the plural users become orthogonal with one another in the chunk. For example, the localized FDMA or the distributed FDMA may be performed in the chunk.

Generally, the TTI is a transmission unit of information. Any kind of control channel is given as overhead for every TTI. When the overhead is transmitted frequently, transmission efficiency of traffic data is inevitably reduced. In this example, the length of the TTI may be adaptively changed. When the TTI is longer, the overhead is transmitted less frequently, thereby improving the transmission efficiency of the traffic data. Contrarily, when the TTI is shorter, significant throughput reduction can be avoided, which is preferable especially when the transmission environment is not favorable, for example.

(B2) Uplink Shared Control Channel

The uplink shared control channel transmits a physical control message and a layer 2 control message (FFS). The uplink shared data channel is scheduled by the base station so that a user related to a better transmission path (channel) can preferentially transmit packets. However, scheduling in accordance with channel conditions is not necessary for the uplink shared control channel. However, any kind of link adaptation (or adaptive modulation and coding (AMC)) may be performed for the uplink control channel, as described later. The base station performs scheduling so as to circumvent contention between the shared control channels and allocates the chunks and TTIs to each mobile station. Regarding the uplink shared control channel, the base station performs scheduling in accordance with the number of the users. In order to maintain a low packet error rate, highly precise control of transmission power is desirable. In addition, high quality received packets are desirable, which is realized by obtaining the frequency diversity effect through transmission of the uplink shared control channel over a wide frequency range.

Specifically, the uplink shared control channel includes one or more pieces of (1) control information related to a scheduled uplink shared data channel, (2) control information related to a scheduled downlink shared data channel, (3) control information for changing contents of the scheduling of an uplink shared data channel, and (4) control information for performing scheduling of a downlink shared data channel.

(1) The control information related to the scheduled uplink shared data channel is transmitted associated with the uplink shared data channel only when the uplink shared data channel is transmitted. The control information, which is also called an associated control channel, includes information necessary for demodulation of the shared data channel (a demodulating method, a channel coding rate, or the like), a transmission block size, information on retransmission, or the like, and may be expressed by an information amount of 4 bits, for example. The retransmission control information may include, for example, information indicating whether a packet to be transmitted through the uplink shared data channel is a retransmission packet or a new packet, and information indicating a way of using the retransmission packet. For example, as a first way of using the retransmission packet, the data of the retransmission packet may be the same as the data of the packet that has already been transmitted (first transmission data), whereas the data of the retransmission packet is different from the data of the packet that has already been transmitted as a second way of using the retransmission packet. In the second way, the packet may be combined with redundancy information of error correction coding.

(2) The control information related to the scheduled downlink shared data channel is transmitted to the base station only when the downlink shared data channel is transmitted from the base station and received by the mobile station. The control information indicates whether a packet is appropriately received (ACK) or not (NACK) in downlink, and is expressed by one bit in the simplest case.

(3) The control information for changing contents of the scheduling of the uplink shared data channel is transmitted in order to notify the base station of a buffer size and/or transmission power of the mobile station. This control information may be transmitted regularly or irregularly. For example, the control information may be transmitted when the buffer size and/or the transmission power are changed. The base station may change the contents of scheduling in order to keep pace with changing circumstances in the mobile station. The buffer size and the transmission power may be expressed by an information amount of 10 bits, for example.

(4) The control information for performing scheduling of the downlink shared data channel is transmitted in order to notify the base station of channel quality information (also referred to as a channel quality indicator (CQI)). The CQI may be a received signal-to-interference power ratio (SIR) measured by the mobile station, for example. This information may be transmitted regularly or irregularly. For example, the information may be transmitted when the channel quality is changed. This control information may be expressed by an information amount of 5 bits, for example.

(C) Pilot Channel

The pilot channel can be transmitted from the mobile station through Time Division Multiple Access, Frequency Division Multiple Access, Code Division Multiple Access, or a combination of the three. However, from the viewpoint of a reduced Peak-to-Average Power Ratio (PAPR), the TDM method is desirable. Since the pilot channel and the data channel become orthogonal by the TDM method, the receiver can accurately demultiplex the pilot channel, thereby contributing to highly accurate channel estimation. Specifically, this is advantageous when the highly accurate channel estimation is required, for example, per antenna in a multi-antenna system such as a MIMO system.

In this example of the present invention, channel estimation is performed distinctly for mobile stations that move at a high velocity and for mobile stations that does not move at a high velocity. To this end, there are prepared a first pilot channel for the mobile stations that do not move at a high velocity (in other words, the mobile stations in a normal communications environment) and a second pilot channel for the mobile stations moving at a high velocity of, for example, up to several hundreds km/h. A predetermined number of the first pilot channels are mapped for every TTI. Preferably, 2 first pilot channels are mapped in the front and the end of every TTI. The first pilot channel may be used for the channel estimation and the quality measurement of the received signal. In addition, the first pilot channel may be used to detect the synchronization timing. The second pilot channels are mapped at one or more places in the TTI depending on the velocity of the mobile station concerned and the transmission path (channel) conditions. No second pilot channel may be mapped depending on the velocity or the like. Namely, the second pilot channel is not always transmitted, which makes the second pilot channel a complimentary channel, whereas the first pilot channel is always transmitted. The number of the first and/or second pilot channels and the places where the mapped first and/or second pilot channels are mapped are arbitrarily determined from predetermined mapping candidates.

Figure 10:
FIG. 10 shows an example of mapping a pilot channel.

FIG. 10 shows an example of mapping the pilot signals, where only the first pilot channels are included. In the illustrated example, eight (data) symbols are included in one TTI, and two first pilot channels are allocated to the top and the end symbols. In the figure, "CP" represents the guard interval according to the cyclic prefix. In addition, "$data_1$", "$data_2$", . . . , represent the contention-based channels or the non-contention-based channels.

Figure 11:
FIG. 11 shows another example of mapping the pilot channel.

FIG. 11 shows another example of mapping, where two first pilot channels and one second pilot channel are included. As shown, the second pilot channel is allocated in the middle of the TTI (for example, at a fourth symbol), which is different from the example shown in FIG. 10. The first and the second pilot channels are used for the channel estimation, thereby estimating more accurately time-wise changes in the transmission path (channel) during the TTI. By the way, the transmission path (channel) is estimated more easily when the mobile station is not moving at a high velocity than when the mobile station is moving at a high velocity. Therefore, the information amount of the first pilot channel may be less than the information amount of the second pilot channel. This is depicted, for example, by symbol periods of time which are shorter for the first pilot channel than for the second pilot channel in FIG. 11. With this, the information transmission efficiency can be improved for the mobile stations that do not move at a high velocity.

(Examples of Channel Mapping)

FIG. 12 shows an example of mapping the uplink shared data channels, the uplink shared control channels, and the pilot channels (or an example of scheduling performed by the base station). In the illustrated example, the entire frequency band usable by a system of, for example, 20 MHz is divided into four frequency chunks (also referred to as system frequency blocks, in some cases) of 5 MHz. One chunk is shared by up to three users. One user can use one or more chunks. For example, a user A can use two chunks on the left. One transmission time interval (TTI) includes eight symbols. One chunk and one TTI constitute a minimum unit of resource allocation.

The uplink shared control channels are time-multiplexed with the uplink shared data channels per symbol in an allocated chunk. The pilot channels (the first pilot channels) are used commonly for the uplink shared control channel and the uplink shared data channel. These pilot channels are used for the CQI measurement and the channel estimation. These pilot channels are mapped at the top and the end symbols of the TTI. In the illustrated example, the complementary pilot channel (the second pilot channel) is not allocated, while this pilot channel may be allocated (or not) depending on the channel quality of each user. Plural shared control channels for plural users are multiplexed in the same symbol by CDMA and/or FDMA, which includes the localized FDMA and the distributed FDMA. According to this multiplexing, the frequency diversity effect is obtained.

The pilot channels and the uplink shared control channels include information on the users whose data are multiplexed in the chunk to be used to transmit the channels, and mapped by FDMA or the like so that pieces of control information corresponding to the users are orthogonal with one another. A more specific example of mapping is described later.

FIG. 13A shows examples of multiplexing the pilot channels and the uplink shared control channels included in the second TTI from the left in FIG. 12. In the illustrated example, the pilot channels are multiplexed by the distributed FDMA method so that signals from the corresponding users are orthogonal with one another, while the uplink shared control channels are multiplexed by the CDMA method so that signals from the corresponding users are orthogonal with one another. Or, the uplink shared control channel may be multiplexed by the distributed FDMA method so that signals from the corresponding users are orthogonal with one another, while the pilot channels may be multiplexed by the CDMA method so that signals from the corresponding users are orthogonal with one another. Moreover, both the pilot channels and the uplink shared control channels may be multiplexed by the FDMA method or the CDMA method. In a mapping example 1, two chunks are used by the user A that can use the two chunks so as to code-multiplex and transmit the uplink shared control channel. This mapping example is advantageous when a transmission amount of data of the user A is large.

In a mapping example 2, the user A that is allowed to use two chunks uses one chunk so as to code-multiplex the shared control channel and transmit the multiplexed channel. In this example 2, fairness is maintained between users.

In a mapping example 3, the user A that is allowed to use two chunks uses two chunks at half transmission power per chunk so as to code-multiplex the shared control channel and transmit the multiplexed channel. In this example 3, fairness is also maintained between users.

(Example of Mapping Procedure)

As stated above, the plural uplink shared control channels for the plural users are multiplexed by the CDM method and/or the FDM method, and the channels related to the corresponding users may be orthogonal with one another. The base station provides the mobile station with information (mapping information) about the way the shared control channels for various users are multiplexed using the downlink shared control channel or the like. The mobile station transmits the uplink shared control channel in accordance with the provided information.

By the way, orthoganality caused by the CDM method is more vulnerable than the orthogonality caused by the FDM method, due to multi-path interference, a reception timing shift, or the like. Therefore, in one example of the present invention, the FDM method is employed when the number of users is less than or equal to a predetermined number $N_f$, and the CDM method is employed in addition to the FDM method when the number of users is more than the predetermined number $N_f$.

FIG. 13B shows an example of a way where the uplink shared control channels for plural users are multiplexed by the localized FDMA method and the CDMA method. In the illustrated example, $N_f$ is equal to 4. As shown, the uplink shared control channels are multiplexed by the localized FDMA method when the number of the users is less than or equal to 4, and multiplexed by both the FDMA method and the CDMA method when the number of the users is more than or equal to 5. By the way, channels for a user 1 and a user 5 occupy the same frequency band and can be distinguished by any different codes $C_A$, $C_B$. Similarly, channels for a user 2 and a user 6 occupy the same frequency band and can be distinguished by some kind of codes. In this case, the codes to be used for the uplink shared control channels by the users 1 through 4 may be the same or different. This is because the codes to be used in this case are used in order to distinguish channels that occupy the same frequency band and it is not necessary to distinguish the channels that occupy different frequency bands by the codes. In the illustrated example, the same codes $C_A$ are used by the users 1 through 4 and the same codes $C_B$ ($C_B \neq C_A$) are used by the users 5 through 8. When there are more users, other different codes $C_C$, $C_D$, . . . are used. The mapping information that is sent to the mobile station by the base station includes information indicating the frequency band, information designating the codes when the codes are used, or the like.

FIG. 13C shows an example of a way where the uplink shared control channels for plural users are multiplexed by the distributed FDMA and the CDMA methods. When the number of the users is less than or equal to 4, the uplink shared control channels are multiplexed by the distributed FDMA method. When the number of the users is more than or equal to 5, the uplink shared control channels are multiplexed by the FDMA and the CDMA methods. Similarly to the example shown in FIG. 13B, the channels for the user 1 and the user 5 occupy the same frequency band and can be distinguished by any different codes $C_A$, $C_B$. Similarly, the channels for the user 2 and the user 6 occupy the same frequency band and can be distinguished by some kind of codes. The codes to be used for the uplink shared control channels by the users 1 through 4 may be the same or different. In the illustrated example, the same codes $C_A$ are used by the users 1 through 4 and the same codes $C_B$ ($C_B \neq C_A$) are used by the users 5 through B. When there are more users, other different codes $C_C$, $C_D$, . . . are used. The mapping information that is sent to the mobile station by the base station includes information indicating plural frequency components, information designating the codes when the codes are used, or the like.

In the example shown in FIG. 13C, since the frequency components of the uplink shared control channels for the corresponding users are distributed over the entire chunks, the frequency diversity effect can be more effective in the example of FIG. 13C than in the example of FIG. 13B. Therefore, the example of FIG. 13C is preferable from the viewpoint of improved signal quality.

(Example of Channel Mapping in Accordance with Types of the Shared Control Channel)

As stated above, the uplink control channel includes one or more pieces of (1) control information related to a scheduled uplink shared data channel, (2) control information related to a scheduled downlink shared data channel, (3) control information for changing contents of scheduling an uplink shared data channel, and (4) control information for performing scheduling a downlink shared data channel. Among these pieces of information, (1) control information related to the scheduled uplink shared data channel, which includes control information necessary for demodulation of the uplink shared data channel, is necessary control information that has to be associated with the uplink shared data channel. Contrarily, the control information related to the scheduled downlink shared data channel (2) and the control information for changing contents of the scheduling of the uplink shared data channel (3) are not necessary control information (or control information different from the necessary control information) and are not necessarily associated with the uplink shared data channel. According to such classification, the control information for changing contents of the scheduling of the uplink shared data channel (3) may be included in the necessary control information, or may be included in the control information different from the necessary control information.

Therefore, regarding a combination of the channels to be transmitted in uplink, the following 3 transmission modes 1, 2, and 3 are contemplated. Namely, there are the following three combinations of the channels included in one radio resource unit (uplink resource unit) determined by one frequency chunk and one transmission time interval (TTI).

A mobile station that operates on the transmission mode 1 transmits the pilot channel, the uplink shared data channel, and the shared control channel that includes only the necessary control information, and therefore does not transmit the control information except for the necessary control information.

A mobile station that operates on the transmission mode 2 transmits the pilot channel, the uplink shared data channel, and the shared control channel that includes all the control information including the necessary control information and the other control information.

A mobile station that operates on the transmission mode 3 transmits the pilot channel and the shared control channel that includes the other control information except for the necessary control information, but does not transmit the uplink shared data channel and the necessary control information. At any mode, the base station notifies the mobile station of an instruction signal and the mobile station transmits various channels in accordance with the instruction signal.

Figure 14:
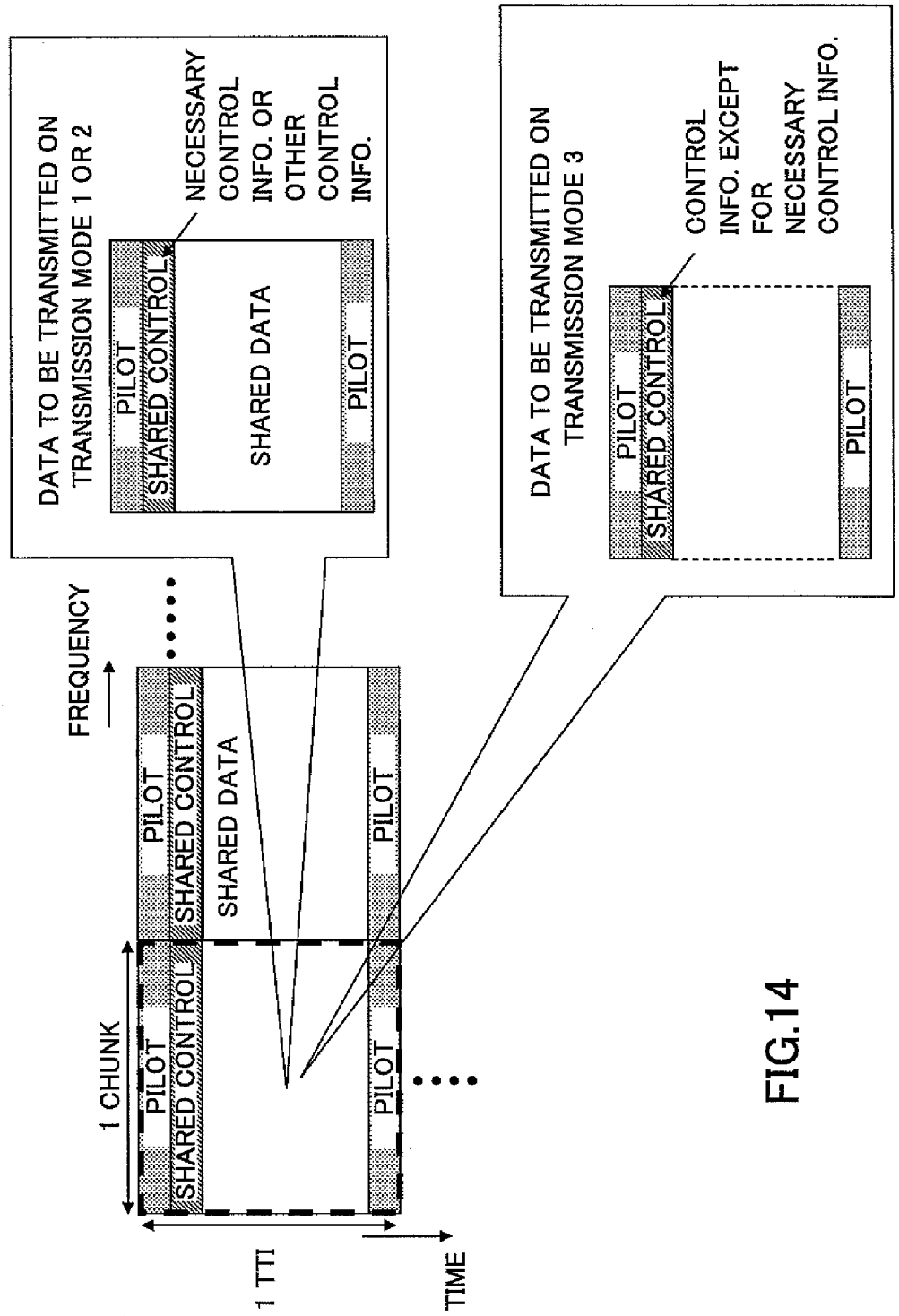
FIG. 14 shows an example of channel mapping in accordance with types of the shared control channels.

FIG. 14 shows an example of channel mapping (part 1) in accordance with the types of the shared control channels. In the illustrated example, data of a user x that transmits the data according to the transmission mode 1 or 2 and data of a user y that transmits the data according to the transmission mode 3 are mapped so that one resource unit is shared by the user x and the user y. Since the pilot channel and the shared control channel of the users x, y are transmitted by the same time slot, the pilot channel and the shared control channel are frequency-multiplexed and/or code-multiplexed so as to be orthogonal with each other. The user x transmits the pilot channel, the shared control channel, the shared data channel, and the pilot channel, in the illustrated order. The user y transmits the pilot signal and the shared control channel, stands ready for a while, and then transmits the pilot channel again. Although each user is referred to as the "user x" or the "user y" for simplicity of explanation, data of the user does not necessarily mean data of only one user but can include as much multiplexed data as possible if the data are allocated to one resource.

Figure 15:
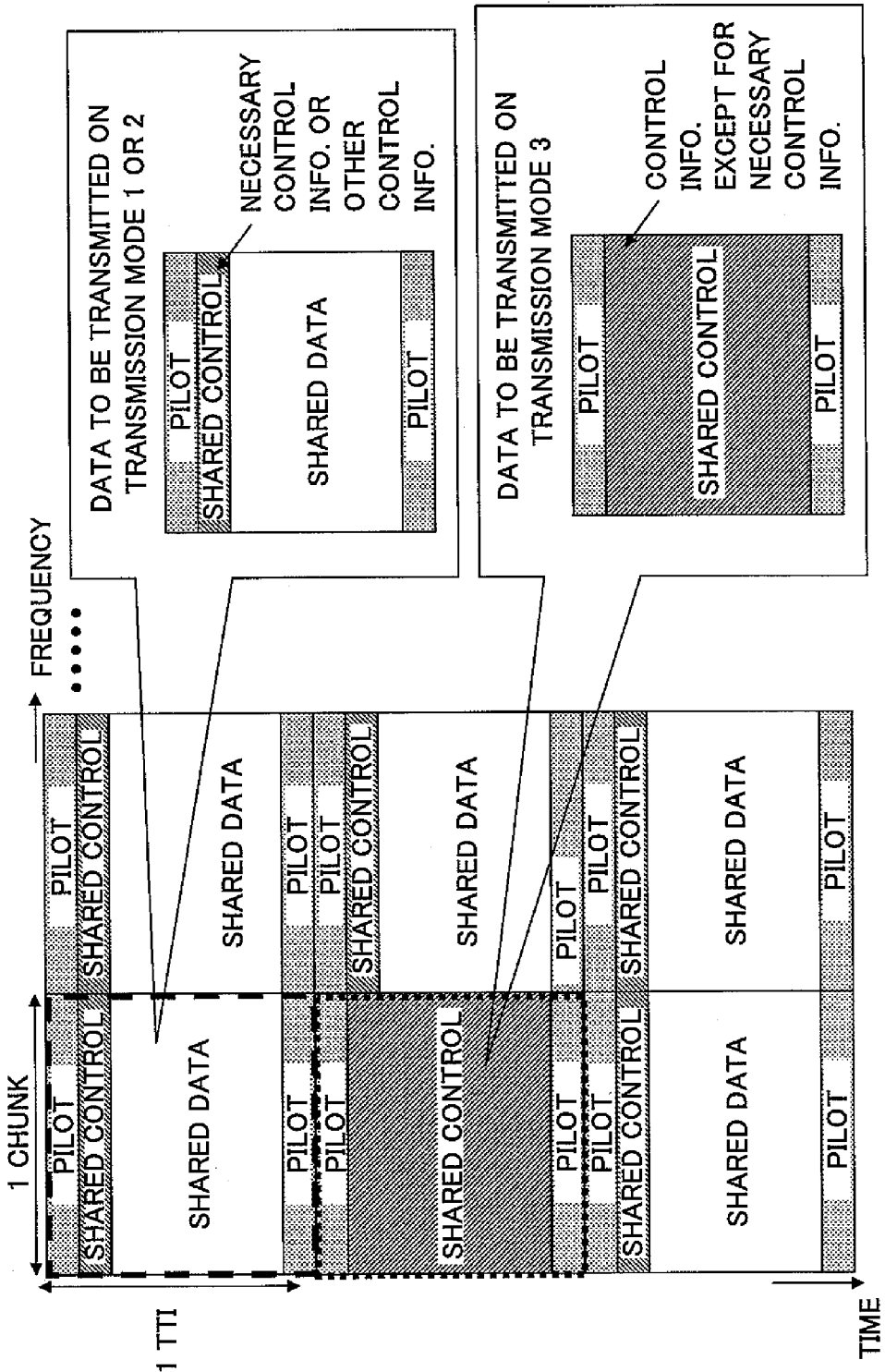
FIG. 15 shows another example of channel mapping in accordance with types of the shared control channels.

FIG. 15 shows an example of channel mapping (part 2) in accordance with the types of the shared control channels. In the illustrated example, the user x that transmits data according to the transmission mode 1 or 2 and one or more users y1, y2, . . . that transmit data on the transmission mode 3 use different radio resources to transmit the data. The user x uses a certain radio resource so as to transmit the pilot channel, the shared control channels (the necessary control information in the case of the transmission mode 1, and the necessary control information and the other control information in the case of the transmission mode 2), the shared data channel and the pilot channel in the order shown in FIG. 15. The one or more users $y_1, y_2, \ldots$ transmit the corresponding pilot channels, the corresponding shared control channels (the other control information except for the necessary control information) and the pilot channels using other radio resources except of the certain radio resource used by the user x. In the other radio resources, the data of the one or more users are time-multiplexed, frequency-multiplexed, code-multiplexed, or multiplexed by any combination of the time-multiplexing, the frequency-multiplexing, and the code-multiplexing methods, so as to be orthogonal with each other. The radio resources that may transmit the control information except for the necessary information (the above-mentioned different radio resources) may be prepared periodically or non-periodically in the time direction and the frequency direction. Or, the period may be varied depending on transmission circumstances. At any rate, the base station notifies each mobile station of the instruction signal so that the control channels (except for the necessary control information) from various mobile stations are received in unison by a certain radio resource. The illustrated example is preferable in terms of reduced interference between the necessary control information and the other control information since the necessary control information is separated in the time direction from the other control information.

Figure 16:
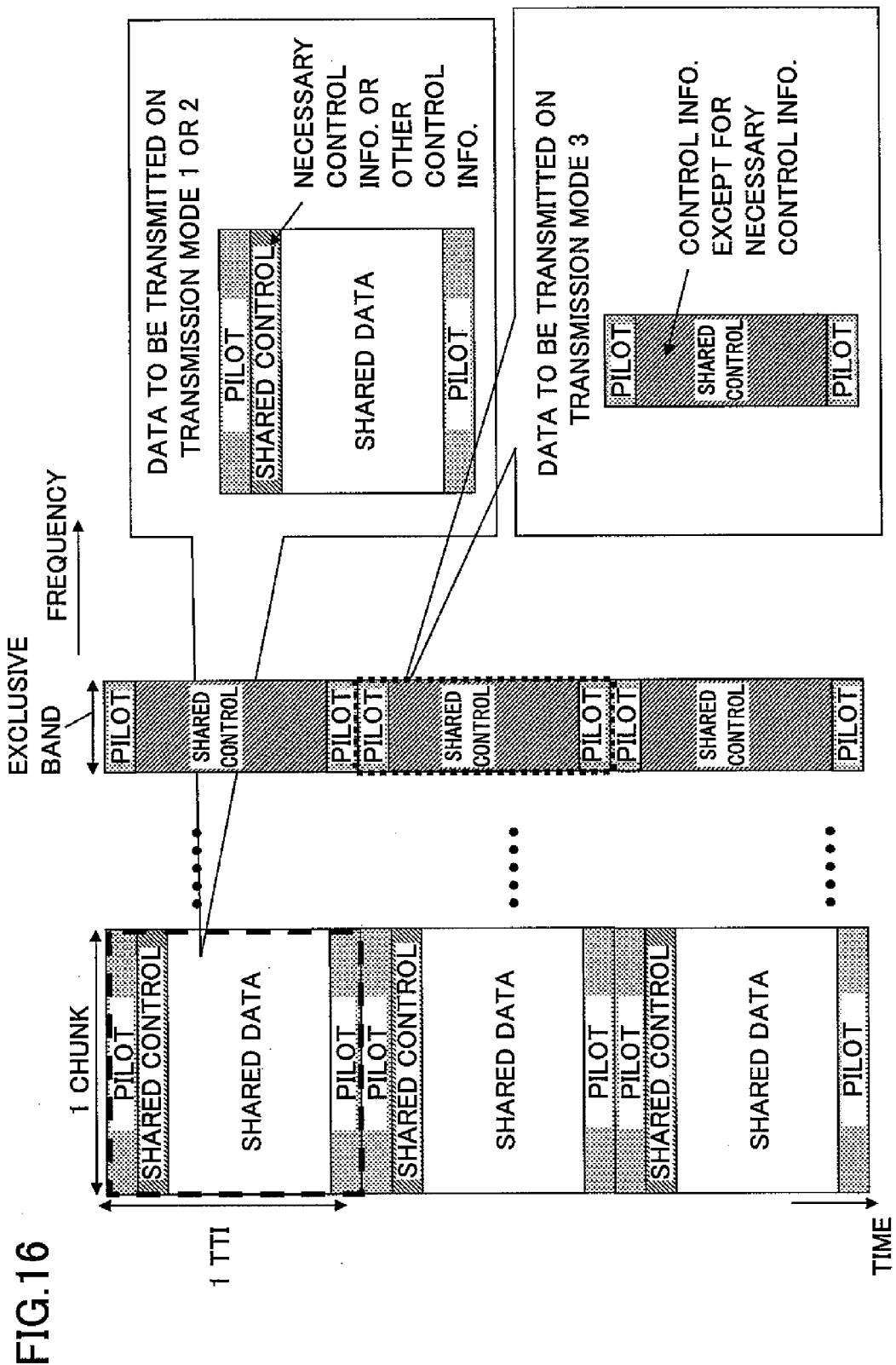
FIG. 16 shows another example of channel mapping in accordance with types of the shared control channels.

FIG. 16 shows an example of channel mapping (part 3) in accordance with the types of the shared control channels. In the illustrated example, the user x that transmits the data according to the transmission mode 1 or 2 and the user y that transmits the data according to the transmission mode 3 use different radio resources so as to transmit the data of their own. It should be noted that there is prepared an exclusive frequency band for the transmission mode 3 in the illustrated example. Since there is not much information quantity of the control information except for the necessary control information, the exclusive band may generally have a frequency bandwidth narrower than one chunk. In the illustrated example, since the radio resource that may transmit the other control information except for the necessary control information is prepared continuously in the time direction, the mobile station can readily transmit the other control information except for the necessary control information, if desired.

Figure 17:
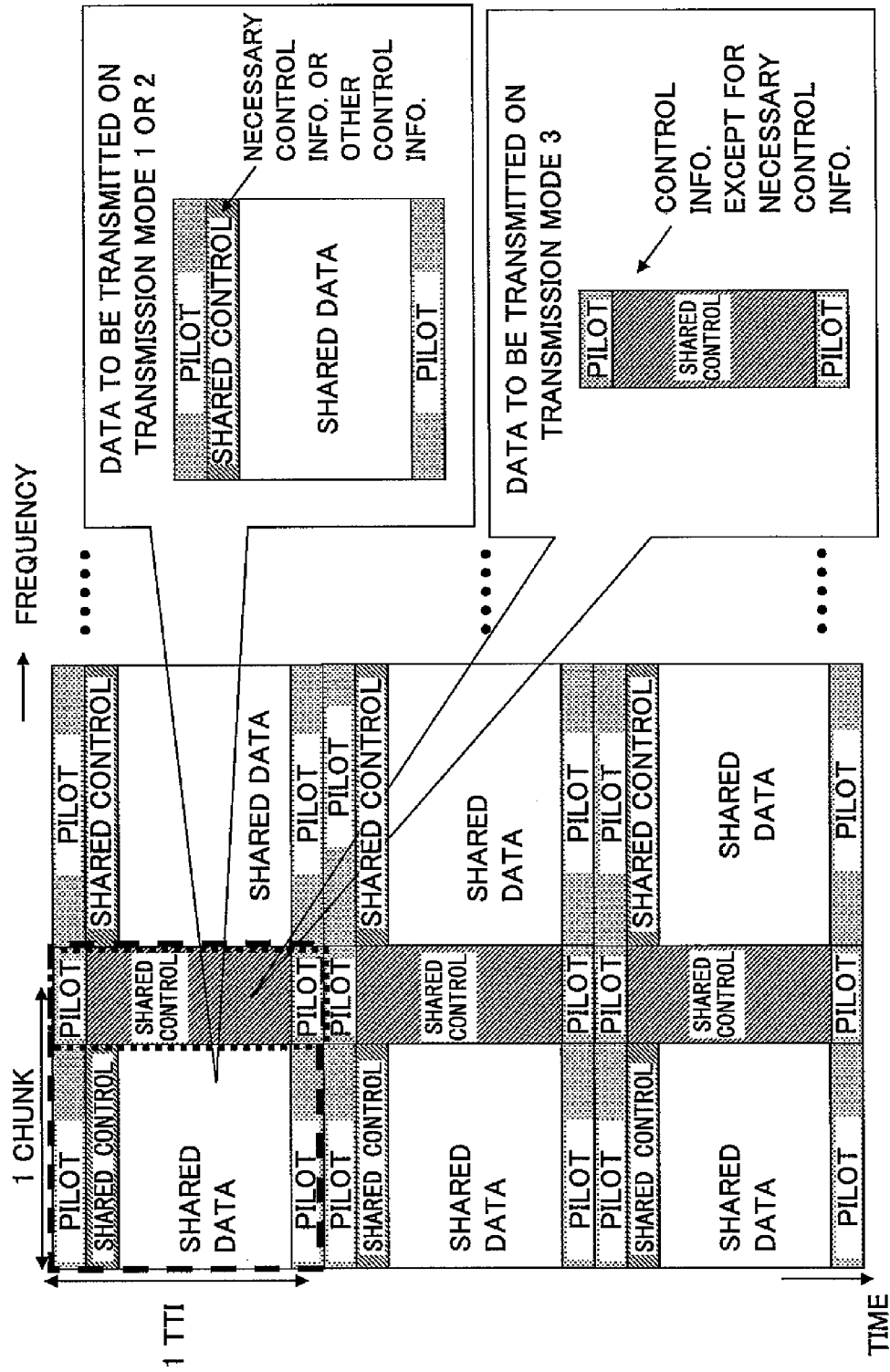
FIG. 17 shows another example of channel mapping in accordance with types of the shared control channels.

FIG. 17 shows an example of channel mapping (part 4) in accordance with the types of the shared control channels. In the illustrated example, a part of the frequency band of a specific frequency chunk is used to transmit the other control information except for the necessary control information. The part of the frequency band may be narrower than the bandwidth of one chunk, as is the case with the exclusive frequency band explained in reference to FIG. 16. In addition, when the time slots that may transmit the other control information except for the necessary control information are prepared continuously in the time direction, the mobile station can readily transmit the other control information except for the necessary control information in the example of FIG. 17. The part of the frequency band in FIG. 17 may be allocated continuously in the time direction, but may be allocated discontinuously. In addition, a position where the part of the frequency band is allocated in the frequency direction may be varied with time.

Figure 18:
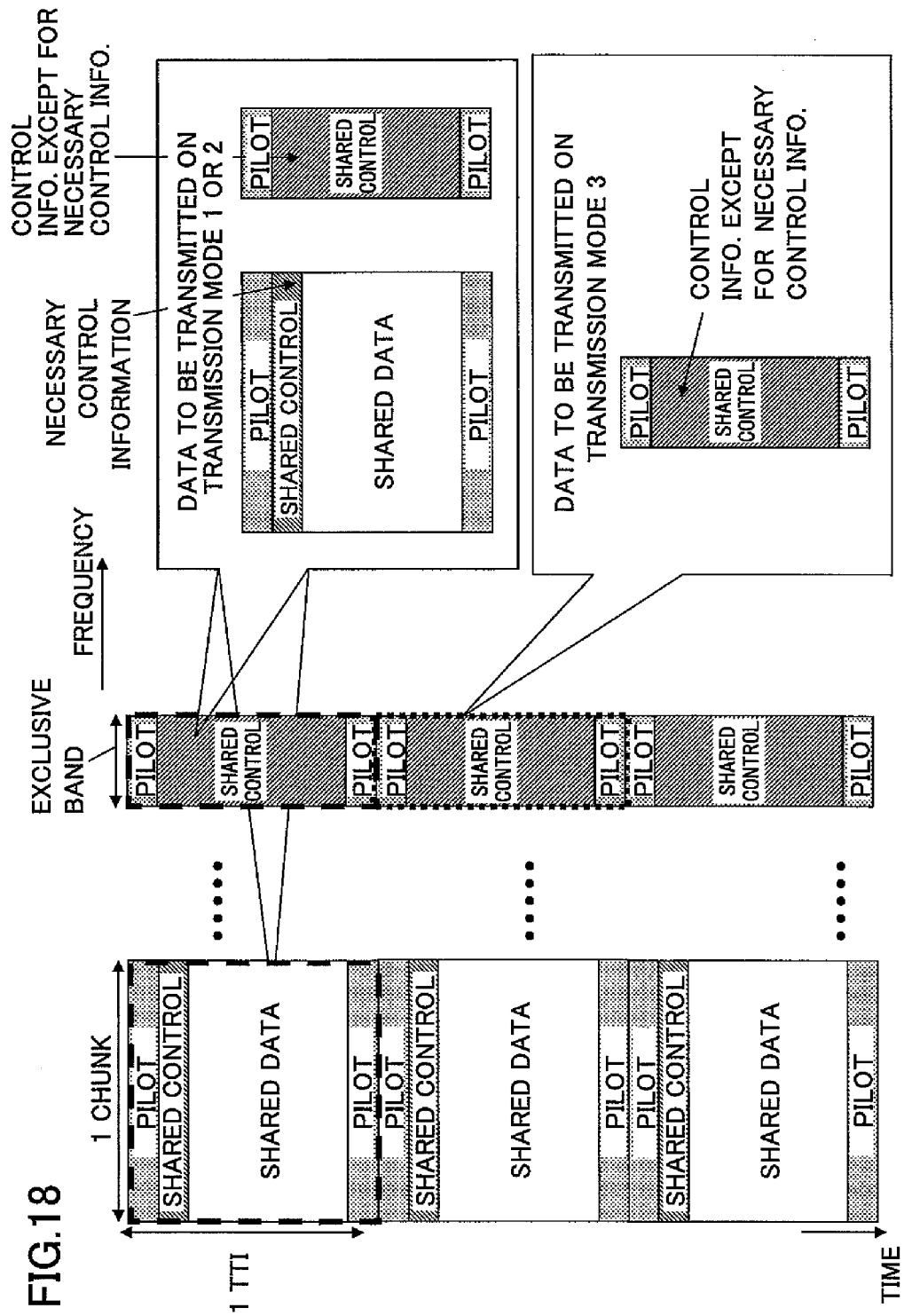
FIG. 18 shows another example of channel mapping in accordance with types of the shared control channels.

FIG. 18 shows an example of channel mapping (part 5) in accordance with the types of the shared control channels. Specifically, FIG. 18 shows how data to be transmitted on the transmission mode 1 or 2 and data to be transmitted on the transmission mode 3 are transmitted. As shown, there is prepared an exclusive frequency band for the data to be transmitted on the transmission mode 3. In addition, a user that performs data transmission on the transmission mode 1 transmits the necessary control information through the shared data channel and the shared control channel using any frequency chunk. On the other hand, a user that performs data transmission on the transmission mode 2 transmits the other control information except for the necessary control information through the exclusive frequency band, while concurrently transmitting the necessary control information through the shared data channel and the shared control channel using any frequency chunk. A user that performs the data transmission on the transmission mode 3 transmits the control information except for the necessary control information through the exclusive frequency band. With this, the base station can acquire the control information except for the necessary control information of all the users by querying a received signal through the exclusive frequency band, which is relatively narrow, thereby facilitating signal processes in the base station.

Figure 19:
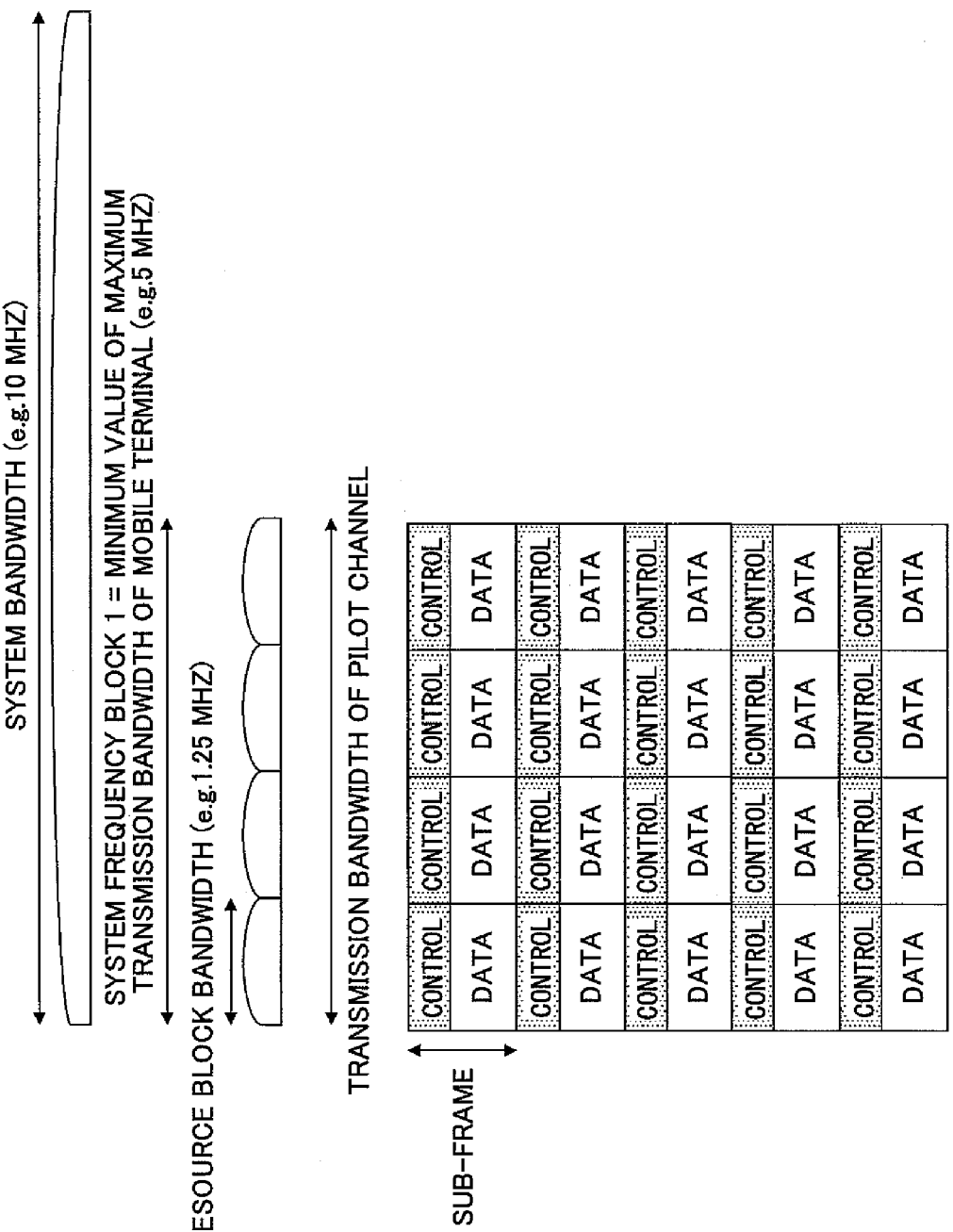
FIG. 19 shows an example of a frequency band to be used in a communications system.

FIG. 19 shows a frequency band to be used in a certain communications system. The frequency band given to the system may include plural system frequency blocks, and a mobile terminal device can perform communications using one or more resource blocks included in the system frequency blocks, which is similar to the example of FIG. 12, although specific values are different. By the way, the frequency band may also be referred to as an entire frequency band or a system frequency band. In the example of FIG. 19, bandwidths of the system frequency band and the system frequency block are 10 MHz and 5 MHz, respectively, and thus the system frequency band includes two system frequency blocks. For simplicity of illustration, only one system frequency block is shown. The resource block has a bandwidth of 1.25 MHz and one system frequency block includes four resource blocks. The base station can determine whether one of the two system frequency blocks can be used for the mobile station in accordance with a bandwidth usable by the mobile station and the number of users communicating in the system. The bandwidth of the system frequency block may be designed so that all the mobile stations that should be allowed to communicate in the system can actually communicate within the bandwidth. In other words, the bandwidth of the system frequency block is determined as the maximum transmission band for the mobile terminal device having the lowest grade expected. Therefore, while either one of the system frequency blocks is allocated to the mobile terminal device that can perform communications only in a bandwidth of 5 MHz, both of the system frequency blocks may be allocated to the mobile terminal device that can perform communication only in a bandwidth of 10 MHz. The mobile terminal device transmits the uplink pilot channel using one or more resource blocks included in the allocated system frequency block. The base station determines (schedules) in accordance with a reception level of the uplink pilot channel the one or more resource blocks to be used to transmit the shared data channel by the mobile terminal device. The content of the scheduling (scheduling information) is provided to the mobile terminal device through the downlink control channel or another channel. The mobile terminal device transmits the uplink shared data channel using the allocated resource blocks. In this case, the shared control channel (shared control channel including the necessary control information) associated with the uplink shared data channel is also transmitted by the same resource blocks. As stated above, the shared control channel may include the other control information except for the necessary control information. As explained in reference to FIGS. 14 through 18, the base station also determines the resource blocks to be used to transmit such control information to the base station by the mobile terminal device.

Figure 20:
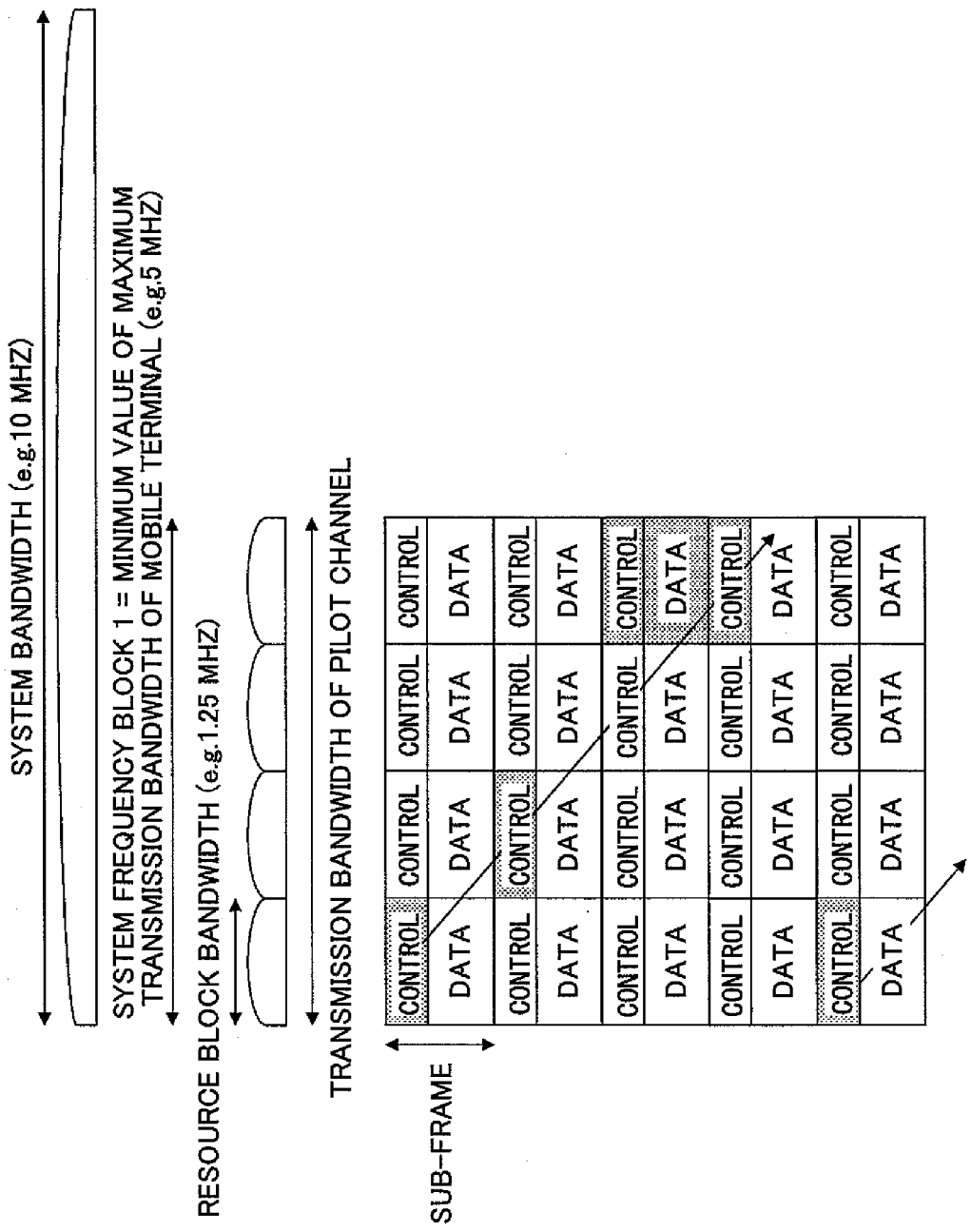
FIG. 20 shows another example of a frequency band to be used in a communications system.

FIG. 20 shows an example where resource blocks to be used by a user to transmit the shared control channel are changed with time. In FIG. 20, the uplink shared control channel of a particular user is transmitted by shadowed portions of the resource blocks. The resource blocks that can be used by the user conform to a frequency hopping pattern shown by the downward-sloping arrow in FIG. 20. The content of the hopping pattern may be known by the base station and the mobile station before starting the communications, or may be provided to the mobile station by the base station, when necessary. Since the frequency hopping is carried out, not only specific resource blocks but also various source blocks are used. Therefore, signal quality of the uplink shared control channel can be maintained at an average level. By the way, the frequency hopping pattern shown in the drawing is merely an example, but various hopping patterns may be employed. In addition, not only one frequency hopping pattern but plural frequency hopping patterns may be prepared as candidates, and the patterns can be optionally switched.

In the illustrated example, the user transmits the control information except for the necessary control information except for a third sub-frame, which is a third one along the time direction. The sub-frame may be referred to as the transmission time interval (TTI). In the third sub-frame, the uplink data channel is transmitted by the rightmost resource block, which also transmits the shared control channel. In the third sub-frame, a different resource block is used without conforming to the frequency hopping pattern. Information on such irregularity is provided through the shared control channel from the base station.

Figure 21:
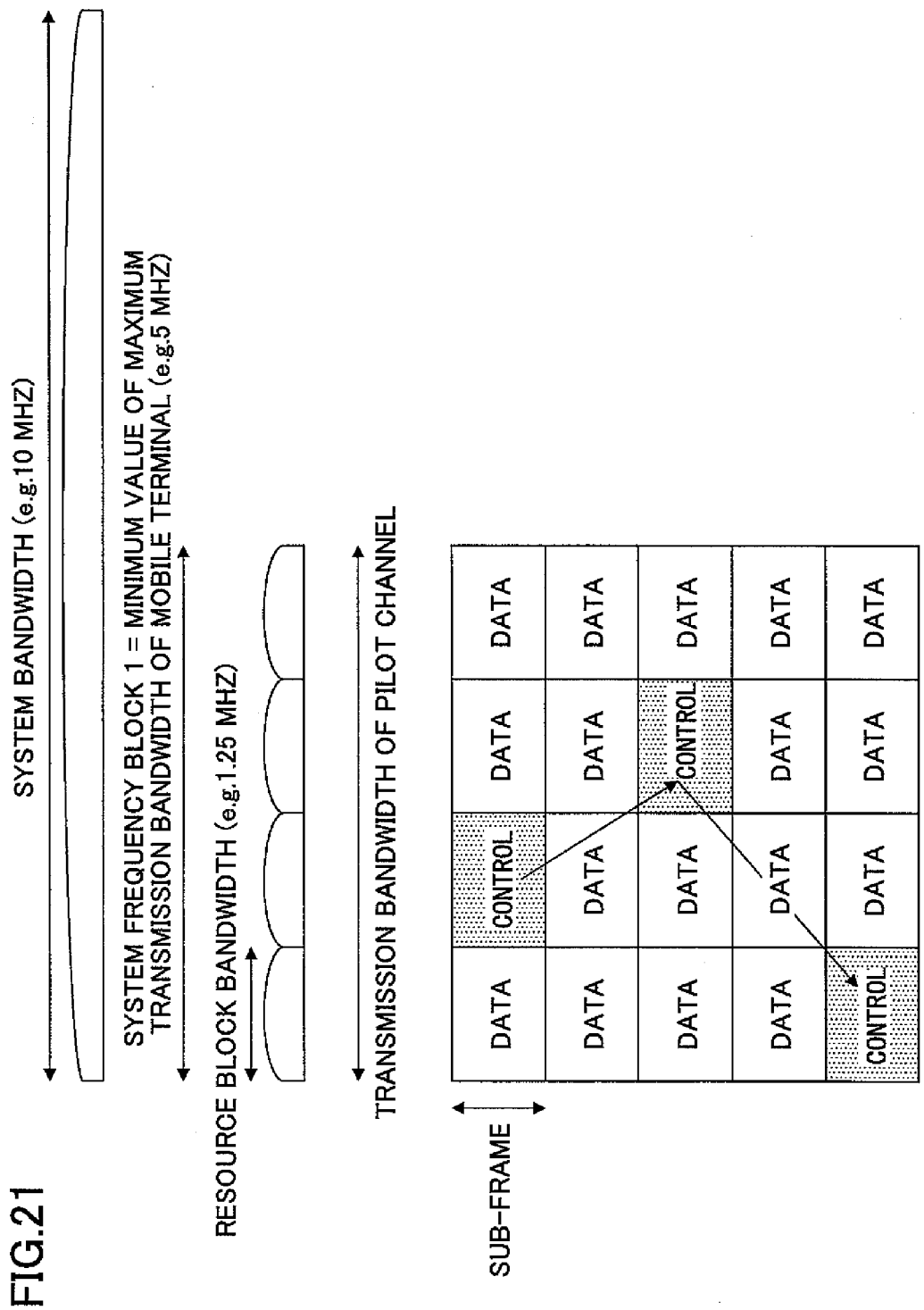
FIG. 21 shows another example of a frequency band to be used in a communications system.
Figure 22:
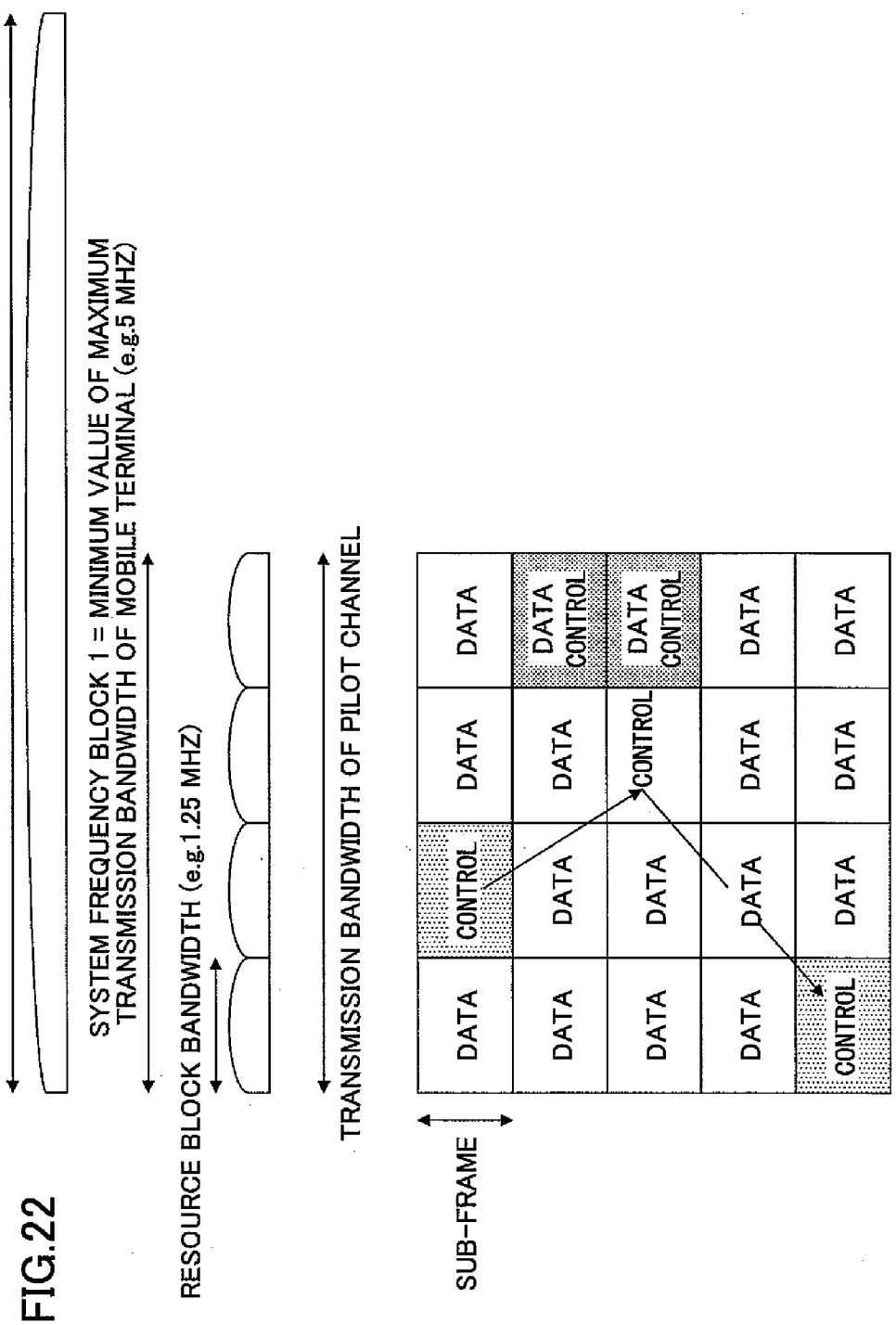
FIG. 22 shows another example of a frequency band to be used in a communications system.

FIG. 21 shows another example where resource blocks to be used by a user to transmit the shared control channel are changed with time. In the illustrated example, plural users that transmit the other control information except for the necessary control information use the same resource blocks and the same sub-frames, as explained in reference to FIG. 15. In this case, the useable resource blocks shown in the drawing may be varied in accordance with the frequency hopping patterns. In addition, even when one user transmits only the other control information except for the necessary control information at a certain point of time, if a radio resource of the uplink shared data channel is allocated afterward, the shared control channel is also transmitted through the resource block for the shared data channel. In FIG. 22, the uplink shared data channel is transmitted by a second sub-frame and the third sub-frame, and the shared control channel is transmitted associated with the uplink shared data channel. This user transmits the shared control channel through the same resource blocks in other sub-frames as the resource blocks used by other users, which perform communications on the transmission mode 3, as is the case with the example shown in FIG. 21.

EXAMPLE 2

Figure 23:
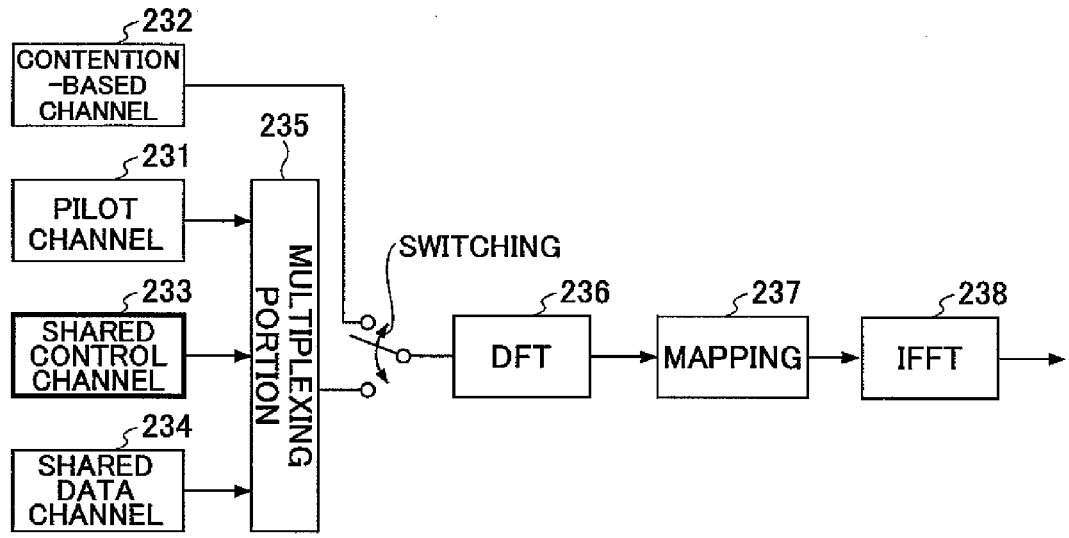
FIG. 23 is a schematic block diagram of a transmitter according to another example of the present invention.

FIG. 23 shows a schematic block diagram of a transmitter according to an example of the present invention. The illustrated transmitter is basically the same as the transmitter shown in FIG. 1, but different in that additional elements are provided due to a functional difference. The illustrated transmitter is generally provided in the mobile station. In FIG. 23, there are illustrated a pilot channel generation portion 231, a contention-based channel generation portion 232, a shared control channel generation portion 233, a shared data channel generation portion 234, a multiplexing portion 235, a discrete Fourier transformation portion 236, a mapping portion 237, and an inverse fast Fourier transformation portion 238.

The pilot channel generation portion 231 generates a pilot channel to be used in uplink.

The shared control channel generation portion 233 generates a shared control channel that may include various pieces of control information. The shared control channel generation portion 233 is described later in reference to FIG. 25.

The shared data channel generation portion 234 generates a shared data channel to be transmitted in uplink.

The multiplexing portion 235 multiplexes one or more channels and outputs the multiplexed channels. As explained for Example 1, various kinds of channel mapping can be employed in uplink. Namely, all the channels shown in the drawing are not necessarily multiplexed, but one or more channels are multiplexed as circumstances demand. In the illustrated example, the multiplexing portion 235 performs the Time Division Multiplexing and the multiplexed signals are allocated to the frequency components by the mapping portion 237. The time multiplexed signals are categorized into the contention-based channel since scheduling is performed under instruction of the base station.

On the other hand, the contention-based channel generation portion 232 generates a contention-based channel. Since the contention-based channel has already been explained, repetitive explanations are omitted.

The contention-based channel and the non-contention-based channel are switched by a switch and either type of signal is transmitted.

The discrete Fourier transformation portion (DFT) 236 performs the Fourier transformation on the input signal (the multiplexed signal in the illustrated example). The discrete Fourier transformation is performed since the signal is a discrete digital signal at this stage of signal processing. With this, a series of signal sequences arranged along the time direction is expressed in the frequency domain.

The mapping portion 237 maps the Fourier-transformed signal components on predetermined sub-carriers in the frequency domain. With this, the localized FDM or the distributed FDM can be performed.

The inverse fast Fourier transformation portion 238 performs the inverse fast Fourier transformation on the mapped signal components and outputs a series of signal sequences arranged along the time direction.

Figure 24:
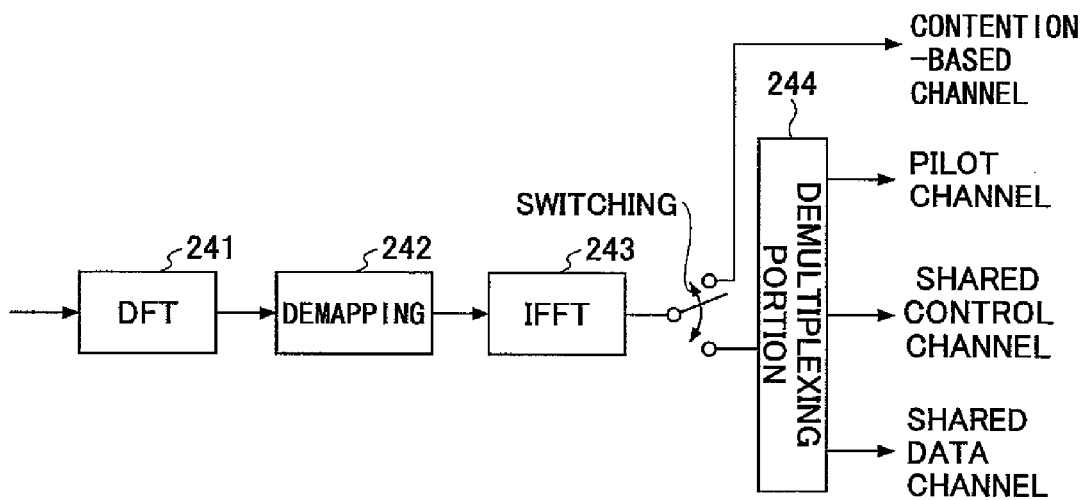
FIG. 24 is a schematic block diagram of a receiver according to another example of the present invention.

FIG. 24 shows a schematic block diagram of a receiver according to an example of the present invention. The illustrated receiver is basically the same as the receiver shown in FIG. 2, but different in that additional elements are provided due to a functional difference. The illustrated receiver is typically provided in the base station. In FIG. 24, there are illustrated a discrete Fourier transformation portion (DFT) 241, a demapping portion 242, an inverse Fourier transformation portion 243, and a demultiplexing portion 244.

The discrete Fourier transformation portion (DFT) 241 performs the Fourier transformation on the input signal (a received signal in the illustrated example). With this, a series of signal sequences arranged along the time direction is expressed in the frequency domain.

The demapping portion 242 extracts predetermined subcarrier components from the Fourier-transformed signal. With this, the signals multiplexed, for example, by the localized FDM and the distributed FDM are demultiplexed.

The inverse fast Fourier transformation portion 243 performs the inverse fast Fourier transformation on the demultiplexed signal components and outputs a series of signal sequences arranged along the time direction.

The demultiplexing portion 244 demultiplexes one or more channels and outputs the demultiplexed channels. In the illustrated example, the signals that are mapped into the frequency components are restored into the pre-mapped signals by the demapping portion 242, and the time-multiplexed signals are demultiplexed by the demultiplexing portion 244.

One or more channels generated by the channel generation portions 231, 232, 233, 234 are time-multiplexed by the multiplexing portion 235, (switched appropriately,) input to the DFT 236, and transformed into the frequency domain signals. The transformed signals are mapped appropriately on the frequency components by the mapping portion 237, input to the IFFT 238, and transformed to the time sequential signals. Subsequently, the signals are transmitted through an element corresponding to the RF portion 14 in FIG. 1. The signals are received by the transmitter shown in FIG. 2 or FIG. 24. The received signals are input to the DFT 241, transformed to the frequency domain signals. Since the transformed signals have once been mapped on the frequency components, the mapped signals are demapped to obtain the pre-mapped signals by the demapping portion 242. The demapped signals are transformed to a time sequential signal by the IFFT 243, demultiplexed appropriately by the demultiplexing portion 244. The demultiplexed signals undergo a demodulation process or the like in processing elements (not shown).

Figure 25:
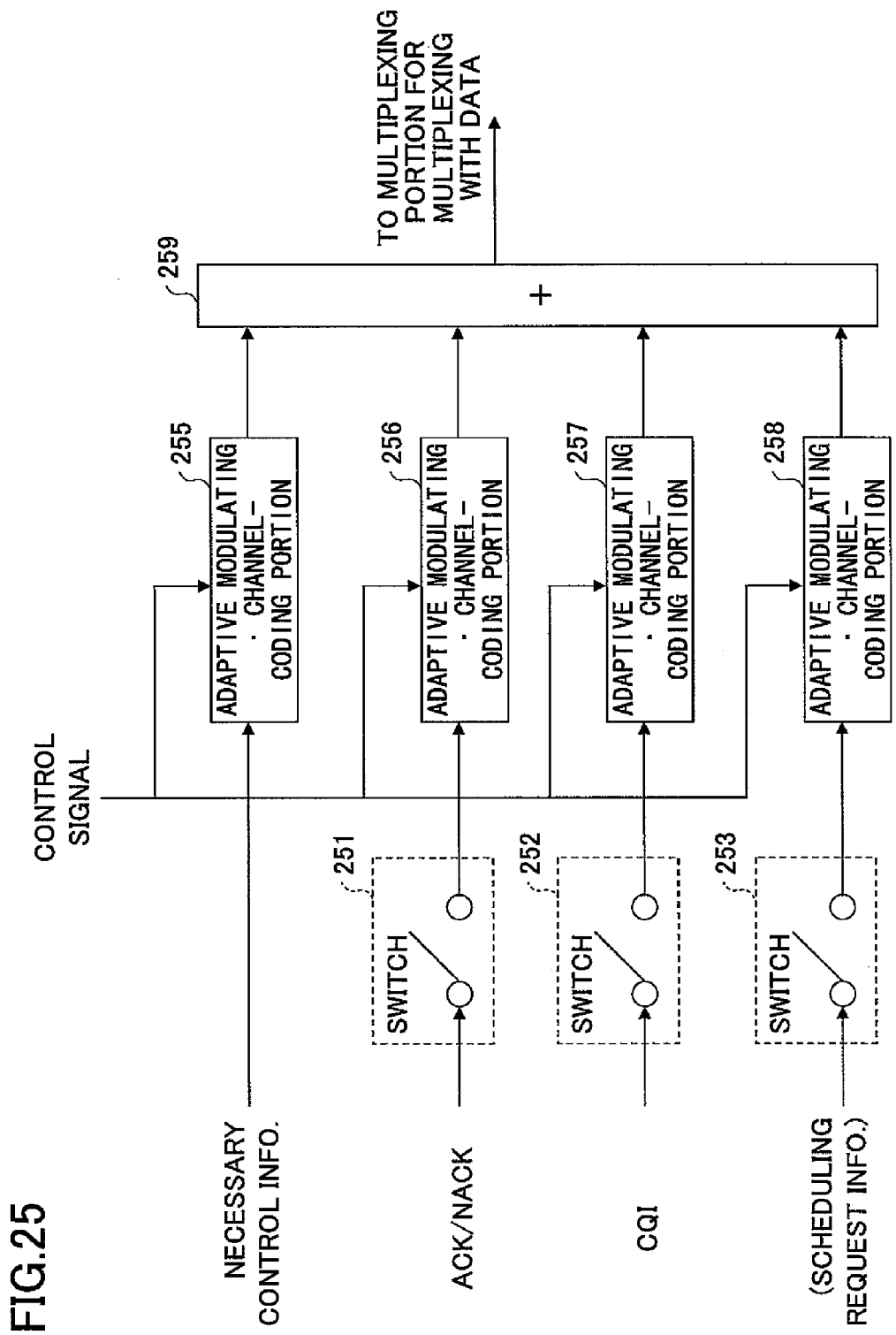
FIG. 25 shows a detailed view of a shared control channel generation portion.

FIG. 25 shows a detailed view of the shared control channel generation portion 233. In FIG. 25, switches 251, 252, 253, modulating and coding portions 255, 256, 257, 258, and a multiplexing portion 259 are illustrated. Each of the switches 251, 252, 253 allows the channel input to one terminal of the switch to go through to the other terminal of the switch, in accordance with an instruction signal (not shown) regarding the shared control channel. The content of the instruction signal is to determine how the shared control channel is configured, namely, what kind of control information should be included in the shared control channel. In the illustrated example, there are illustrated as the control information that may be included in the shared control channel (1) the necessary control information, (2) information indicating a successful reception or an unsuccessful reception of a downlink channel—a positive acknowledgement (ACK) or a negative acknowledgement (NACK), (3) information for changing the content of scheduling, and (4) channel condition information (CQI) indicating a reception quality of the downlink pilot channel.

Each of the modulating and coding portions 255, 256, 257, 258 modulates the channel input to the modulating and coding portion by a selected modulating method and encodes the modulated channel by a selected coding method. The modulating method and the coding method may be different in each channel, or the same method may be used for two or more channels. The modulating method and the coding method may be unchangeably determined.

The multiplexing portion 259 multiplexes the channels, generates the shared control channel, and outputs the generated shared control channel.

In a conventional transmission through the shared control channel, the modulating method and the coding method are determined and fixed, and a required quality is intended to be obtained by controlling the transmission power. However, from the viewpoint of high quality channel, effective use of the resources, or the like, further link adaptation regarding the transmission of the shared control channel is preferably employed. As a method of link adaptation, Adaptive Modulation and Coding (AMC) Scheme and Transmission Power Control (TPC) can be cited.

Figure 26:
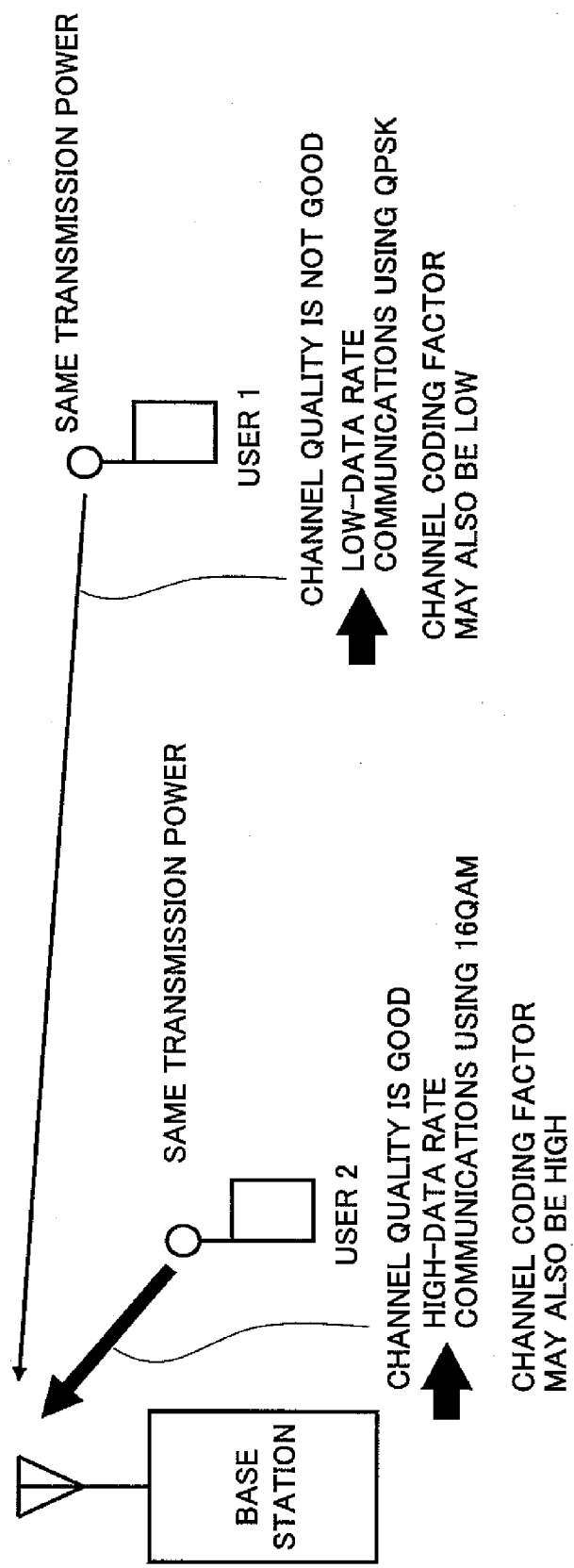
FIG. 26 shows a way where an AMC control is carried out.

FIG. 26 shows a principle of the AMC control that adaptively changes either one of a modulating method and a coding method, or both, in accordance with the channel quality, thereby realizing a required quality in the receiver. Specifically, when users (mobile stations) 1, 2 transmit at the same transmission power, the channel quality in the user 1 which is located far away from the base station is expected to be lower (or CQI is expected to be worse). Therefore, the number of modulation level values (modulation orders) is set to be lower and/or a channel coding rate is set to be lower. In the illustrated example, Quadrature Phase Shift Keying (QPSK) is employed as the modulating method for the user 1 and two-bit information per symbol is transmitted. On the other hand, the channel quality for the user 2 which is located near the base station is expected to be higher (or CQI is expected to be better). Therefore, the number of the modulation level values (modulation orders) is set to be higher and/or the channel coding rate is set to be higher. In the illustrated example, 16 Quadrature Amplitude Modulation (QAM) is used as the modulating method for the user 2 and four-bit information per one symbol is transmitted. With this, a required quality is realized by enhancing reliability for the user in a bad channel condition, thereby improving throughput while maintaining the required quality for the user in a good channel condition. When plural combinations of the modulating methods and the coding methods are prepared in advance, the number of transmission control bits can be saved by transmitting information indicating the combination to be employed (a Modulation and Coding Scheme (MCS) number). FIG. 27 shows an example of such combinations. The MCS numbers may be the same as the numbers used for the shared data channels, or may be prepared separately from the MCS numbers for the shared control channels. Or, part of the numbers prepared for the shared data channels may be used as the MCS numbers. This is because the shared control channels do not require a fast transmission, while the shared data channels require the fast transmission. When received channels are demodulated in the AMC method, since information on the modulating method, the coding method, and the number of the symbols is required, any kind of measures have to be taken in order to notify the receiver of the information. In addition, since the number of transmittable bits per one symbol is different depending on the channel quality, a large number of symbols are required when the channel quality is impaired, whereas data transmission can be performed at a small number of symbols when the channel quality is good. In contrast to the shared data channel, the MCS to be employed for the shared control channel may be determined in accordance with the number of control bits to be required for transmission. Namely, when a large number of control bits has to be transmitted, a large MCS number (a large number of modulation level values (modulation orders), a large channel coding rate) may be employed. In addition, when only a small number of control bits is required, a small MCS number (a small number of modulation level values (modulation orders), a small channel coding rate) may be employed.

Figure 28:
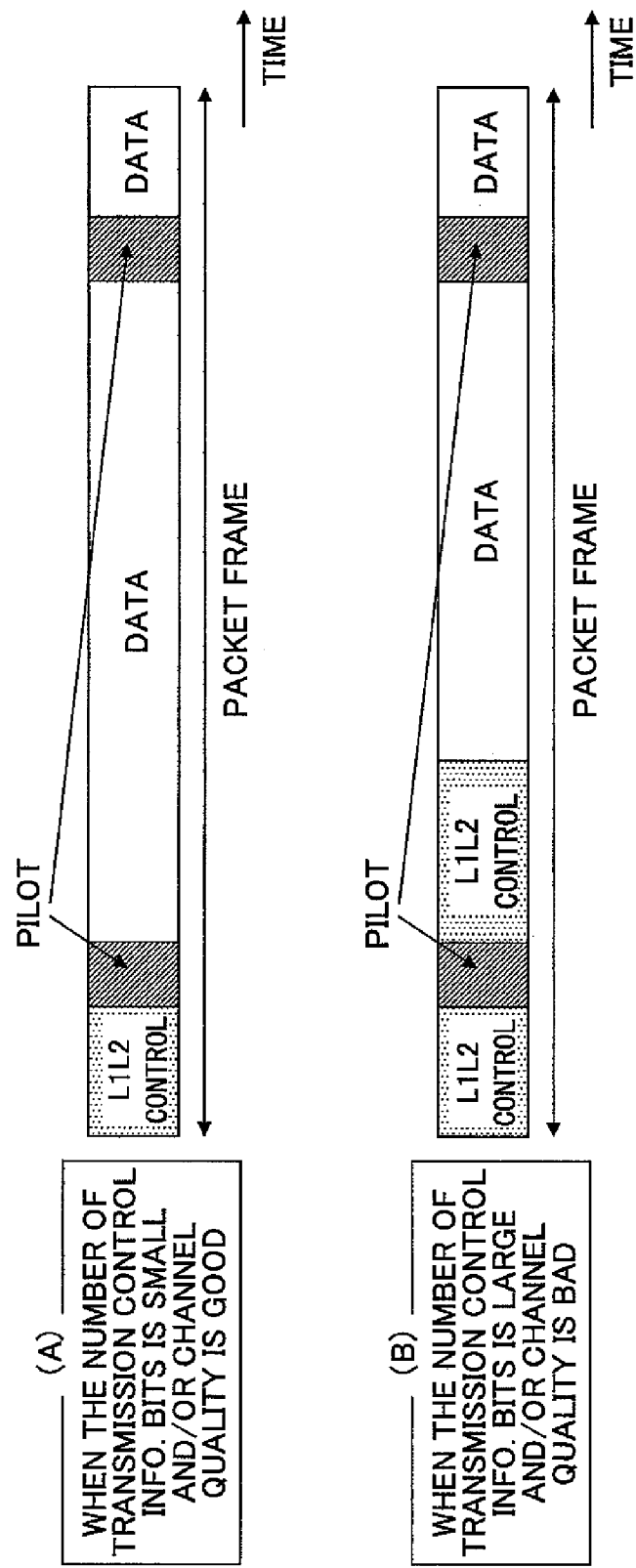
FIG. 28 is an example of an uplink frame configuration.

FIG. 28 shows an example of an uplink frame configuration. The shared control channel, the pilot channels, and the shared data channels are multiplexed by the time division multiplexing (TDM) method. The shared control channel mainly includes information to be used to demodulate the shared data channel, and may be referred to as a L1L2 signaling control channel. In situations indicated by (A), the uplink channel quality is good and a relatively large MCS number is used for the shared control channel. Therefore, the L1L2 signaling control channel occupies a relatively short period of time. In situations indicated by (B), the uplink channel quality is good enough to such a degree that resource allocation can be scheduled, but is not good if compared with the situations (A). In this case, a relatively small MCS number is used for the shared control channel. Therefore, the L1L2 signaling control channel occupies a relative long period of time. The MCS number may be changed depending on not only the channel quality explained above but also the number of control bits to be transmitted. For example, when a Multiple Input Multiple Output (MIMO) method is employed, transmission contents may be different from antenna to antenna. Therefore, the number of the control bits may be different per mobile terminal; in addition the number of the control bits to be used for the shared control channel may be different depending on the number of antennas used, or the like. In this case, when the number of the control bits to be transmitted through the shared control channel is large, a large MCS number may be used (A), whereas when the number is small, a small MCS number may be used (B).

Figure 29:
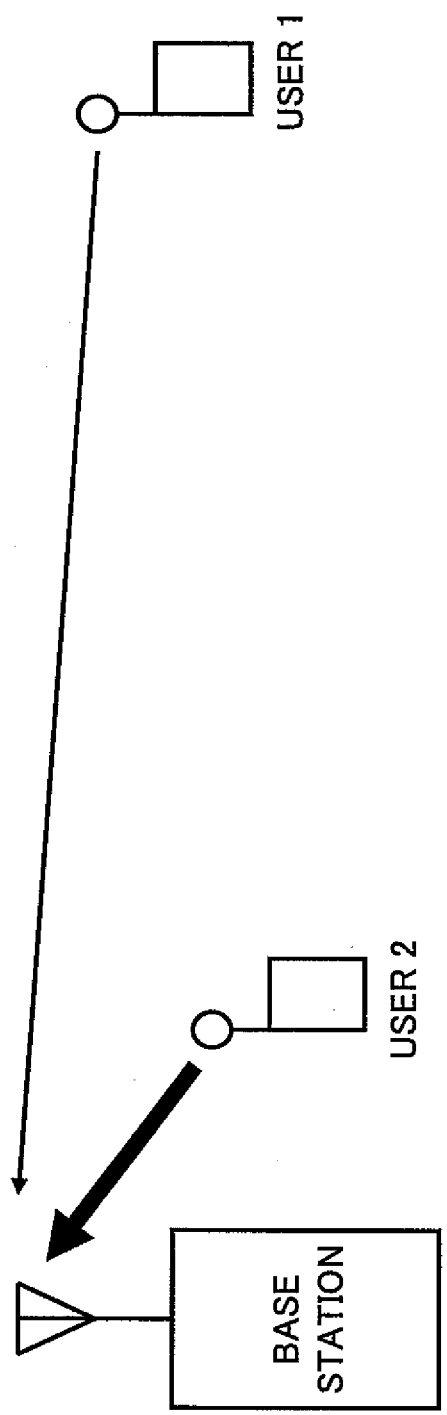
FIG. 29 shows a way where a TPC is carried out.

FIG. 29 shows a transmission power control method, in which a required quality is intended to be realized in a receiver by controlling transmission power. More specifically, since the channel quality is expected to be lower for the user 1 which is located far away from the base station, the downlink channel is transmitted at higher transmission power. On the other hand, the channel quality is expected to be higher for the user 2 which is located near the base station. In this case, if the user 2 transmits the uplink channel at higher transmission power even though the channel quality for the user 2 is better, other users suffer from strong interference from the user 2. Since the channel quality is basically good, a required quality is realized even at low transmission power. Therefore, the uplink channel is transmitted at relatively low transmission power in this case. When the transmission power control is solely employed, the modulating method and the coding method are not changed and the combination known by the transmitter and the receiver is used. Therefore, it is not necessary under the transmission power control method to notify the mobile station of the modulating method or the like in order to demodulate the channels.

Figure 30:
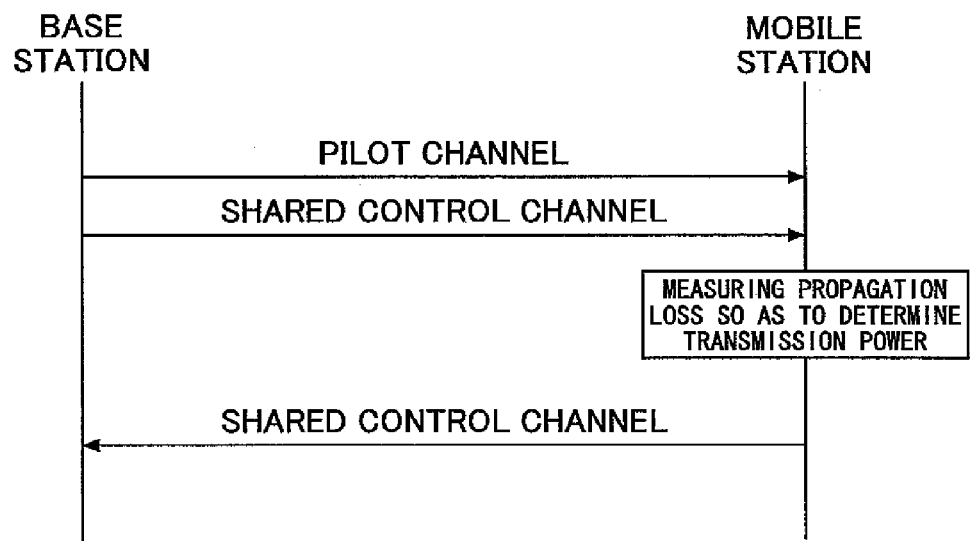
FIG. 30 shows a way where an open-loop TPC is carried out.

FIG. 30 is a flowchart illustrating an example of the transmission power controlling method. This method is generally called open-loop transmission power control. Here, the method is called "open-loop TPC" for simplicity. In this method, the base station transmits the downlink pilot channel to the mobile station. The mobile station receives the downlink pilot channel for a certain period of time and calculates an average path-loss or a propagation loss L. The propagation loss L is determined mainly by distance changes and shadowing, and in general is not very different between uplink and downlink, if averaged out for an appropriate period of time. For example, instantaneous fluctuations by fading are no longer influential when averaging out the reception quality for a relatively long period of time, which may correspond to, for example, one or more frames. The mobile station estimates the uplink transmission power by using the propagation loss L and transmits the shared control channel at the estimated transmission power. The propagation loss L is expressed by a difference between transmission power $P_t$ at the base station and transmission power $P_r$ at the mobile station. A broadcast channel broadcasted from the base station may include the transmission power $P_t$ at the base station, uplink interference power $I_0$, and a target quality $SIR_r$.

Figure 31:
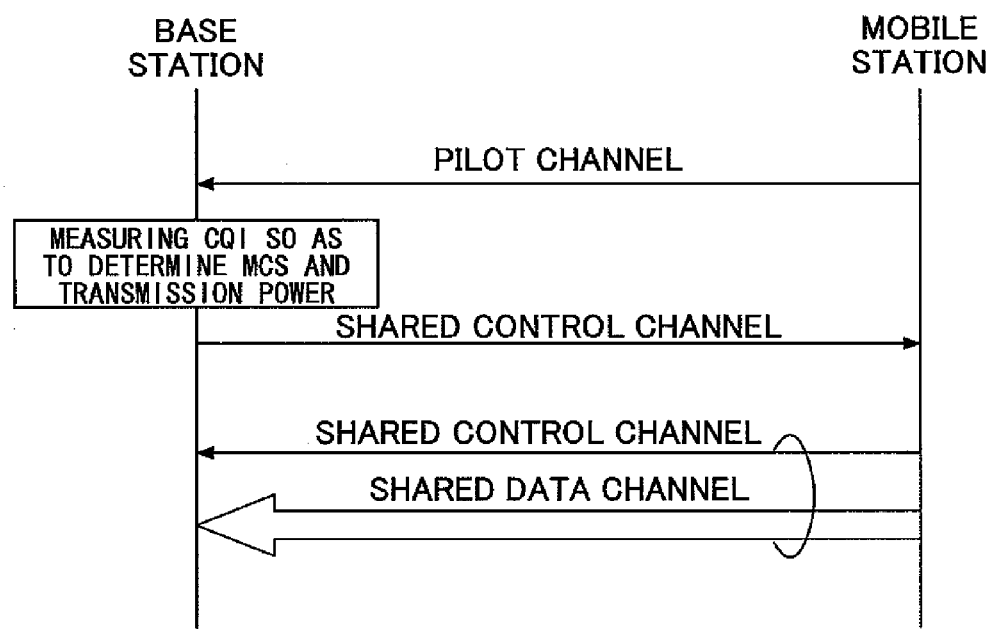
FIG. 31 shows a CQI-based TPC.

FIG. 31 is a flowchart illustrating another transmission power control method. This method is called "CQI-based TPC" for convenience sake. First, the mobile station transmits an uplink pilot channel to the base station and the base station measures the CQI in accordance with a reception level of the uplink pilot channel. The base station refers to a table as shown in FIG. 27 and determines the MCS number to be used for the uplink data channel in accordance with the CQI. A corresponding relationship between the MCS number of the shared data channel and the transmission power to be applied to the shared control channel has been known by the base station and the mobile station. The determined contents (MCS number) are provided through the downlink shared control channel to the mobile station. Subsequently, the mobile station derives the transmission power corresponding to the shared control channel from the provided MCS number, and transmits the shared data channel and the shared control channel to the base station.

FIG. 32 shows combinations of the control information and the transmission power control method. As stated above, the shared control channel may include the necessary control information and the control information except for the necessary control information. The necessary control information includes information indicating the MCS or the like to be used for the uplink shared data channel. The MCS or the like is provided from the base station to the mobile station in advance. As stated, the corresponding relationship between the transmission power of the shared control channel and the MCS number of the shared data channel can be set in advance. Therefore, since the mobile station can derive the transmission power of the uplink shared control channel from the provided MCS number, it is not necessary for the shared control channel to include the control bits for controlling the transmission power of the uplink shared control channel. Since the shared data channel cannot be demodulated if the necessary control information is not appropriately received, the shared control channel including the necessary control information has to be transmitted with high quality. Therefore, the CQI-based TPC, which is more precise than the open-loop TPC, is desirably employed.

On the other hand, quality of the control information except for the necessary control information is allowed to be less or equal to the quality of the necessary control information. Therefore, the CQI-based TPC or the open-loop TPC may be employed. However, when the CQI-based TPC is employed, information to be used to control the transmission power of the uplink shared control channel is required to be included in the downlink shared control channel.

By the way, in normal AMC control performed on the shared data channel, the transmission power is maintained at a constant level and the communications are carried out by a certain combination (MCS) of the modulating method and the coding method, which are selected in accordance with the channel quality, in order to maintain the signal quality. In one example of the present invention, the AMC control is carried out also on the shared control channel. Although a high throughput is not required for the shared control channel, if compared with the shared data channel, application of the AMC control can improve the quality of the shared control channel by selecting an appropriate MCS in accordance with the channel quality.

Figure 33A:
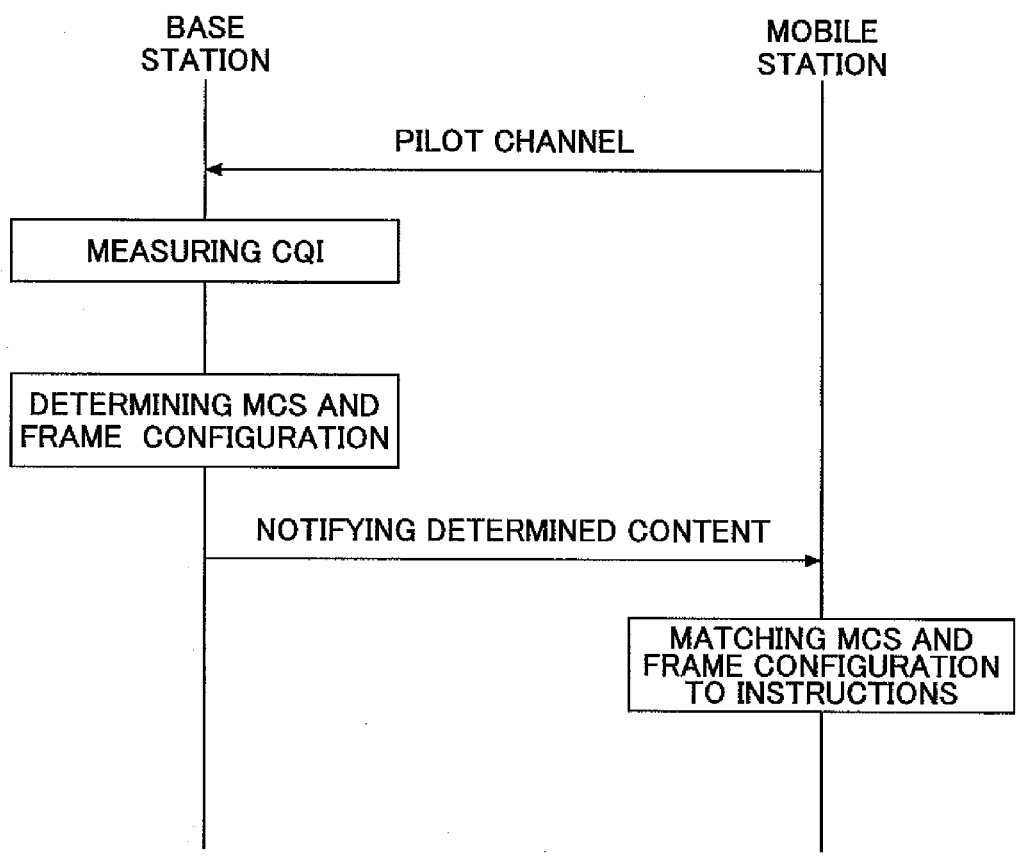
FIG. 33A is a flowchart for determining an MCS of the uplink control channel and a frame configuration.

FIG. 33A shows operations for determining a transmission method of the uplink shared control channel (especially, the L1/L2 signaling channel). As stated above, scheduling is performed on the shared data channel per TTI, and an appropriate MCS and/or transmission power are selected at a given time. The selected MCS is provided to the mobile station through the L1/L2 signaling channel. The relationship between the MCS and the transmission power has been known by the mobile station. Therefore, the mobile station performs the data modulation and the data coding on the shared data channel in accordance with the provided MCS and thus transmission at the appropriate transmission power. The MCS and the transmission power to be used in L1/L2 signaling may be determined and fixed. However, the MCS and the transmission power are desirably changed to some extent in accordance with the transmission circumstances, from the viewpoint of improved transmission quality. Taking account of this, the following operations may be employed.

First, the mobile station transmits the pilot channel to the base station. Generally, the pilot channel is transmitted at regular intervals in uplink. When receiving the pilot channel, the base station measures the uplink channel quality and acquires the channel quality information (CQI).

The base station determines radio parameters regarding the uplink shared control channel in accordance with the channel quality information (CQI). The radio parameters may include pieces of information indicating a combination (MCS) of the modulating method and the channel coding rate, transmission period ($T_{L1L2}$) of the uplink shared control channel, transmission power ($P_{TX}$), or the like. Such parameters may be stored in any memory device, for example, in the form of a table. The channel quality information (CQI), the modulation and coding rate information MCS, the transmission period $T_{L1L2}$, and the transmission power $P_{TX}$ are related to one another, and at least from the channel quality information (CQI) are consequently derived other parameters. Generally, channel quality information CQI of a low quality channel is related to the MCS having a small number of transmission bits, a long transmission period $T_{L1L2}$, and high transmission power $P_{TX}$. Contrarily, channel quality information CQI of a high quality channel is associated with the MCS having a large number of transmission bits, a short transmission period $T_{L1L2}$, and low transmission power $P_{TX}$. FIG. 33B shows an example of a corresponding relationship between the radio parameters. In the illustrated example, the channel quality information (CQI), the modulation and coding rate information MCS, the transmission period $T_{L1L2}$, and the transmission power $P_{TX}$ are related to one another. In order to preferably maintain the frame configuration, the transmission period $T_{L1L2}$ is only changed if the reception quality becomes highly detrimental to communications. Any number of combinations of the radio parameters may be prepared. However, it is not required to prepare as many combinations as possible in order to compensate for instantaneous fading. The number of the combinations may be limited when average fading or path-loss (distance changes, shadowing, or the like) can be compensated for.

When the base station determines various radio parameters, the transmission method for the uplink shared control channel is determined. For example, the frame configuration shown in FIG. 28(A) is employed for a user having good channel quality, whereas the frame configuration shown in FIG. 28(B) is employed for a user having bad channel quality. Information indicating the determined parameters is provided to the mobile station through the shared control channel. Information indicating the radio parameters is not required to individually express all the above parameters. For example, when the radio parameter table is shared by the base station and the mobile station, only the MCS is provided to the mobile station, and the mobile station derives other parameters from the MCS. Or, the CQI measured at the base station may be provided to the mobile station. At any rate, the mobile station has to appropriately know the radio parameters determined at the base station. In this example, the MCS determined from the reception quality CQI of the uplink pilot channel is provided to the mobile station.

The mobile station sets various radio parameters in accordance with the provided instruction. More specifically, the MCS is set at the shared control channel generation portion 233 of FIG. 23 (the adaptive modulating and coding portions 255 through 258 of FIG. 25). The transmission period $T_{L1L2}$ of the shared control channel is adjusted at the multiplexing portion 235 of FIG. 23. In addition, the transmission power is adjusted at the adaptive modulating and coding portions 255 through 258 and/or the multiplexing portion 259 of FIG. 25 so that only the signal of the adjusted power is output from the multiplexing portion 259.

Subsequently, the shared control channel is transmitted based on the appropriately adjusted radio parameters.

By the way, in order that the base station appropriately receives the uplink shared control channel, the base station does not necessarily know the transmission power of the uplink shared control channel. This is because the higher the transmission power is, the higher the reception quality becomes. Namely, no information about a degree or change of the transmission power is transmitted in each case between the base station and the mobile station. On the other hand, if the transmission period $T_{L1L2}$ and the MCS of the shared control channel are unknown, no appropriate reception is possible. Therefore, the information indicating the radio parameters such as the MCS or the like has to be communicated between the base station and the mobile station though any signaling channel every time the information is changed. Or, it is required to perform blind detection in which demodulation is carried out in the receiver using all the combinations so as to confirm the appropriate reception using error detection decoding or the like. Frequent use of the signaling channels may lead to increased consumption of the radio resources as well as complicated signal processing. Therefore, the MCS or the like of the shared control channel per se shown in FIG. 33A is adjusted in relatively long periods, and may be transmitted as an L3 signaling channel. On the other hand, the transmission power of the shared data channel and the shared control channel is updated in relatively short periods by the CQI-based TPC shown in FIG. 31.

In the manner mentioned above, the high quality shared control channel is realized by appropriately adjusting one or more of the modulating and coding methods MCS of the uplink shared control channel, the transmission period $T_{L1L2}$, and the transmission power $P_{TX}$.

EXAMPLE 3

The mobile station and the base station may communicate with each other using a single antenna or plural antennas, or may constitute a multi-antenna system, especially, a Multi Input Multi Output (MIMO)-based system. In this case, the uplink shared control channel may be transmitted from a single antenna or plural antennas. In the former case, one of the plural antennas provided in the mobile station is used to transmit the shared control channel. As a MIMO-based transmission method, there are a MIMO multiplexing method and a MIMO diversity method. In the MIMO multiplexing method, different signals are transmitted on the same frequency in the same period of time from each antenna, which is preferable in terms of high throughput. However, when the shared data channel is not transmitted, or when the shared data channel is transmitted by the MIMO diversity method, it is not preferable or practical to transmit the shared control channel by the MIMO multiplexing method. Therefore, the shared control channel is transmitted by the MIMO multiplexing method only when the shared data channel to be associated with the shared control channel is transmitted by the MIMO multiplexing method. By the way, while the shared data channel is transmitted fast by the MIMO multiplexing method, the shared control channel to be associated with the shared control channel may be transmitted by the MIMO diversity method.

There are several kinds of the MIMO diversity methods such as a Time Switched Transmit Diversity (TSTD) method, a Delay Diversity method, and Spaced Time Block Coding (STBC) method or the like. In the TSTD method, a signal is instantaneously transmitted from one antenna, and the antennas for transmitting the signal are changed with time. In the delay diversity method, transmission timing of a signal is purposefully changed in each antenna, and various delay paths are combined in a receiver. In the STBC method, a certain set of plural symbols is converted into another set of symbols by changing the symbol order, changing polarities, and/or converting into a complex conjugate number. At any rate, while the MIMO diversity method provides substantially the same throughput as the single antenna method, the MIMO diversity method can improve reliability of the data transmission. On the other hand, the MIMO multiplexing method can provide high throughput. Among the MIMO diversity methods, the TSTD method is advantageous in that a large total amount of information to be transmitted and high process workload in the receiver are not required, compared with the other methods.

When the MIMO-based system is composed of the base station and the mobile station, the mobile station is required to transmit feedback signals to each transmission antenna of the base station. For example, the feedback signals may include information indicating a successful reception (ACK) or an unsuccessful reception (NACK) of the downlink channel, the channel quality information (CQI) or the like. These pieces of information are the same as the control information except for the necessary control information, as stated above. The base station inquires the downlink channel quality per antenna in accordance with the feedback signals transmitted back to corresponding antennas. In this case, the plural feedback signals prepared per transmission antenna of the base station may be transmitted within one sub-frame or unit transmission time interval (see FIG. 34(A)). With this, the control delay can be reduced regardless of the number of the transmission antennas. However, the number of control bits necessary per sub-frame is increased, as the number of the antennas is increased. Or, the feedback signal for one antenna may be transmitted in one sub-frame (see FIG. 34(B)). With this, the number of the control bits necessary per sub-frame is maintained constant, thereby maintaining a transmission frame configuration regardless of the number of the transmission antennas. However, since the control delay may be increased, the number of the feedback signals per transmission antenna is preferably reduced. For example, when the number of the antennas is 2, it is preferable that the feedback signal be transmitted once in one sub-frame in the case of the technique (A), whereas it is preferable that the feedback signal be transmitted 0.5 times in one sub-frame in the case of the technique (B).

Although the present invention has been described referring to several individual examples for simplicity of explanations, practicing each of these individual examples is not essential to the present invention, but one or more examples in combination may be implemented in accordance with demands.

This international patent application is based on Japanese Priority Applications Nos. 2005-174397, 2005-317568, 2006-9301, 2006-31751, and 2006-127988, filed on Jun. 14, 2005, Oct. 31, 2005, Jan. 17, 2006, Feb. 8, 2006, and May 1, 2006, respectively, with the Japanese Patent Office, the entire contents of which are hereby incorporated by reference.

The invention claimed is:

1. A mobile station comprising:
a mapping portion that maps an uplink shared data channel to which an uplink shared control channel and a pilot channel pertain, on a resource block assigned by a base station,
wherein plural resource blocks are arranged on a frequency axis and plural resource blocks are time-divisionally multiplexed on a time axis in an uplink; and
a transmitting portion that transmits the uplink shared data channel mapped in the mapping portion,
wherein the mapping portion arranges the uplink shared control channel right before and right after the pilot channel in the uplink shared data channel to which the uplink shared control channel and the pilot channel pertain.

2. A mobile station comprising:
a mapping portion that maps an uplink shared data channel to which an uplink shared control channel and a pilot channel pertain, on a resource block assigned by a base station,
wherein plural resource blocks are arranged on a frequency axis and plural resource blocks are time-divisionally multiplexed on a time axis in an uplink; and
a transmitting portion that transmits the uplink shared data channel mapped in the mapping portion,
wherein the mapping portion arranges the uplink shared control channel before and after the pilot channel in the uplink shared data channel to which the uplink shared control channel and the pilot channel pertain, and
wherein the mapping portion maps on a resource block an uplink shared control channel to which no uplink shared data channel pertains, in a sub-frame on which an uplink shared data channel is not mapped,
wherein the transmission portion transmits the uplink shared control channel mapped in the mapping portion,
wherein a modulation method of the uplink shared data channel mapped in the mapping portion is variable, and
wherein a modulation method of the uplink shared control channel mapped in the mapping portion is variable within a range less than or equal to a transmission rate of the uplink shared data channel.

3. The mobile station of claim 2, wherein the mapping portion maps the uplink shared control channel in accordance with a frequency hopping pattern.

4. A transmission method comprising steps of:

mapping an uplink shared data channel to which an uplink shared control channel and a pilot channel pertain, on a resource block assigned by a base station, wherein plural resource blocks are arranged on a frequency axis and plural resource blocks are time-divisionally multiplexed on a time axis in an uplink; and transmitting the mapped uplink shared data channel, wherein the uplink shared control channel is arranged right before and right after the pilot channel in the uplink shared data channel to which the uplink shared control channel and the pilot channel pertain, in the mapping step.

5. A communication system comprising:

a mobile station that transmits an uplink shared data channel; and a base station that receives the uplink shared data channel from the mobile station, wherein the mobile station comprises:

a mapping portion that maps an uplink shared data channel to which an uplink shared control channel and a pilot channel pertain, on a resource block assigned by a base station, wherein plural resource blocks are arranged on a frequency axis and plural resource blocks are time-divisionally multiplexed on a time axis in an uplink; and a transmitting portion that transmits the uplink shared data channel mapped in the mapping portion, wherein the mapping portion arranges the uplink shared control channel right before and right after the pilot channel in the uplink shared data channel to which the uplink shared control channel and the pilot channel pertain.

6. A base station comprising:

a receiving portion that receives an uplink shared data channel, mapped on a resource block assigned to a mobile station, to which an uplink shared control channel and a pilot channel pertain, wherein plural resource blocks are arranged on a frequency axis and plural resource blocks are time-divisionally multiplexed on a time axis in an uplink; and a processing portion that processes the uplink shared data channel received in the receiving portion, wherein the uplink shared control channel is arranged right before and right after the pilot channel in the uplink shared data channel, received in the receiving portion, to which the uplink shared control channel and the pilot channel pertain.

7. The base station of claim 6, wherein the receiving portion receives an uplink shared control channel to which no uplink shared data channel pertains, in a sub-frame on which an uplink shared data channel is not mapped.

8. The base station of claim 7, wherein the uplink shared control channel received in the receiving unit is mapped in accordance with a frequency hopping pattern.

9. A receiving method in a base station, comprising steps of:

receiving an uplink shared data channel, mapped on a resource block assigned to a mobile station, to which an uplink shared control channel and a pilot channel pertain, wherein plural resource blocks are arranged on a frequency axis and plural resource blocks are time-divisionally multiplexed on a time axis in an uplink; and processing the received uplink shared data channel, wherein the uplink shared control channel is arranged right before and right after the pilot channel in the uplink shared data channel, received in the receiving step, to which the uplink shared control channel and the pilot channel pertain.

* * * * *